(12) United States Patent
Koo et al.

(10) Patent No.: US 12,368,853 B2
(45) Date of Patent: Jul. 22, 2025

(54) METHOD AND DEVICE FOR TRANSFORM-BASED IMAGE CODING

(71) Applicant: LG ELECTRONICS INC., Seoul (KR)

(72) Inventors: Moonmo Koo, Seoul (KR); Jaehyun Lim, Seoul (KR); Seunghwan Kim, Seoul (KR); Mehdi Salehifar, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 133 days.

(21) Appl. No.: 17/763,118

(22) PCT Filed: Oct. 8, 2020

(86) PCT No.: PCT/KR2020/013758
§ 371 (c)(1),
(2) Date: Mar. 23, 2022

(87) PCT Pub. No.: WO2021/071297
PCT Pub. Date: Apr. 15, 2021

(65) Prior Publication Data
US 2022/0345710 A1 Oct. 27, 2022

Related U.S. Application Data

(60) Provisional application No. 62/913,678, filed on Oct. 10, 2019, provisional application No. 62/912,624, filed on Oct. 8, 2019.

(51) Int. Cl.
*H04N 19/18* (2014.01)
*H04N 19/132* (2014.01)
(Continued)

(52) U.S. Cl.
CPC ......... *H04N 19/132* (2014.11); *H04N 19/176* (2014.11); *H04N 19/18* (2014.11); *H04N 19/70* (2014.11)

(58) Field of Classification Search
None
See application file for complete search history.

(56) References Cited

U.S. PATENT DOCUMENTS

2021/0058642 A1\* 2/2021 Egilmez .............. H04N 19/593
2022/0295099 A1\* 9/2022 Zhang ................... H04N 19/46
2022/0394255 A1\* 12/2022 Kang .................... H04N 19/61

FOREIGN PATENT DOCUMENTS

KR   10-2019-0052008 A   5/2019
KR   10-1997604 B1       7/2019

OTHER PUBLICATIONS

Benjamin Bross et al., "Versatile Video Coding (Draft 6)", JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-439, see pp. 12, 66, 76-79, 142, 151-153, 285-287, 304, 376 and 387.

(Continued)

*Primary Examiner* — Samuel D Fereja
(74) *Attorney, Agent, or Firm* — Bryan Cave Leighton Paisner LLP

(57) ABSTRACT

An image decoding method according to the present document may comprise the steps of: deriving residual samples by applying at least one of LFNST and MTS to transform coefficients; and generating a reconstructed picture on the basis of the residual samples, wherein the LFNST is performed on the basis of an LFNST transform set, an LFNST kernel included in the LFNST transform set, and an LFNST index indicating the LFNST kernel, a first bin of a syntax element bin string for the LFNST index is derived on the basis of different context information according to a tree (Continued)

type of a current block, and a second bin of the syntax element bin string is derived on the basis of preconfigured context information.

9 Claims, 17 Drawing Sheets

(51) Int. Cl.
*H04N 19/176* (2014.01)
*H04N 19/70* (2014.01)

(56) References Cited

OTHER PUBLICATIONS

Takeshi Tsukuba et al., "Non-CE6: Context modeling for LFNST index coding", JVET-P0271-v1, Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-5, see p. 1.
Karam Naser et al., "CE6 Related: Modified LFNST Index Coding For Fast Encoder Implementation", JVET-P0350-r3, Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-10, see p. 2.
Lainema et al. "CE6-related: LFNST transform mapping," ITU-T SG 16 WP 3 and ISO/IEC JTC 1/SC 29/WG 11, JVET-P0197-v2, 7 pages, Oct. 2019.

* cited by examiner (a)

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | | | | |
| 37 | 38 | 39 | 40 | | | | |
| 41 | 42 | 43 | 44 | | | | |
| 45 | 46 | 47 | 48 | | | | |

| 1 | 2 | 3 | 4 |
|---|---|---|---|
| 5 | 6 | 7 | 8 |
| 9 | 10 | 11 | 12 |
| 13 | 14 | 15 | 16 |

(a)

| 1 | 9 | 17 | 25 | 33 | 37 | 41 | 45 |
|---|---|---|---|---|---|---|---|
| 2 | 10 | 18 | 26 | 34 | 38 | 42 | 46 |
| 3 | 11 | 19 | 27 | 35 | 39 | 43 | 47 |
| 4 | 12 | 20 | 28 | 36 | 40 | 44 | 48 |
| 5 | 13 | 21 | 29 | | | | |
| 6 | 14 | 22 | 30 | | | | |
| 7 | 15 | 23 | 31 | | | | |
| 8 | 16 | 24 | 32 | | | | |

| 1 | 5 | 9 | 13 |
|---|---|---|---|
| 2 | 6 | 10 | 14 |
| 3 | 7 | 11 | 15 |
| 4 | 8 | 12 | 16 |

| 1 | 3 | 6 | 10 |
|---|---|---|----|
| 2 | 5 | 9 | 13 |
| 4 | 8 | 12| 15 |
| 7 | 11| 14| 16 |

(a)

| 1 | 3 | 6 | ✕ |
|---|---|---|---|
| 2 | 5 | ✕ | ✕ |
| 4 | 8 | ✕ | ✕ |
| 7 | ✕ | ✕ | ✕ |

(b)

(a) 4x4　　　　　(b) 8x4 / 4x8

(c) 4xN / Nx4, when N≥16　　　　　(d) 8x8

(e) MxN(M≥8, N≥8, M>8 or N>8)

(a) 4x4  (b) 8x4 / 4x8

(c) 4xN / Nx4, when N≥16  (d) 8x8

(e) MxN(M≥8, N≥8, M>8 or N>8)

(c) 4xN / Nx4, when N≥16

(d) 4xN / Nx4, when N≥16

(b) MxN(M≥8, N≥8, M>8 or N>8)

METHOD AND DEVICE FOR TRANSFORM-BASED IMAGE CODING

This application is a National Stage Application of International Application No. PCT/KR2020/013758, filed on Oct. 8, 2020, which claims the benefit of and priority to U.S. Provisional Application No. 62/912,624, filed on Oct. 8, 2019 and U.S. Provisional Application No. 62/913,678, filed on Oct. 10, 2019, which are hereby incorporated by reference in their entirety for all purposes as if fully set forth herein.

BACKGROUND OF THE DISCLOSURE

Field of the Disclosure

The present disclosure relates to an image coding technique and, more particularly, to a method and an apparatus for coding an image based on transform in an image coding system.

Related Art

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

Another technical aspect of the present disclosure provides a method and an apparatus is to provide a method and apparatus for increasing efficiency of LFNST index coding.

Still another object of this document is to provide a method and apparatus for improving efficiency of a secondary transform through the coding of an LFNST index According to an embodiment of this document, there is provided an image decoding method performed by a decoding apparatus. The method may include deriving residual samples by applying at least one of an LFNST or MTS to the transform coefficient, and generating a reconstruction picture based on the residual samples. The LFNST may be performed based on an LFNST transform set, an LFNST kernel included in the LFNST transform set, and an LFNST index indicating the LFNST kernel. The first bin of a bin string of a syntax element for the LFNST index may be derived based on different context information depending on a tree type of the current block, and the second bin of the bin string of the syntax element may be derived based on the preset context information.

The image decoding method may further include deriving context information of the syntax element for the LFNST index, decoding the bins of the bin string of the syntax element for the LFNST index based on the context information, and deriving a value of the syntax element for the LFNST index.

When the tree type of the current block is a single tree, the first bin may be derived as first context information. When the tree type of the current block is not a single tree, the first bin may be derived as second context information.

The context information for the second bin may be derived as third context information different from the first context information and the second context information.

The LFNST transform set may include two LFNST kernels. The value of the syntax element may include any one of 2 indicating a case where the LFNST is not applied to the current block, 1 indicating a first LFNST kernel among the LFNST kernels, and 2 indicating a second LFNST kernel among the LFNST kernels.

The value of the syntax element may be binarized as a truncated unary code. The value 0 of the syntax element may be binarized as '0', the value 1 of the syntax element may be binarized as '10', and the value 2 of the syntax element may be binarized as '11.'

According to an embodiment of this document, there is provided an image encoding method performed by an encoding apparatus. The method may include deriving prediction samples for a current block, deriving residual samples for the current block based on the prediction samples, deriving transform coefficients for the current block by applying at least one of an LFNST or MTS to the residual samples, and encoding an LFNST index indicating an LFNST kernel and quantized residual information. The LFNST may be performed based on an LFNST transform set and the LFNST kernel included in the LFNST transform set. The first bin of a bin string of a syntax element for the LFNST index may be derived based on different context information depending on a tree type of the current block, and the second bin of the bin string of the syntax element may be derived based on the preset context information.

According to still another embodiment of the present disclosure, there may be provided a digital storage medium that stores image data including encoded image information and a bitstream generated according to an image encoding method performed by an encoding apparatus.

According to yet another embodiment of the present disclosure, there may be provided a digital storage medium that stores image data including encoded image information and a bitstream to cause a decoding apparatus to perform the image decoding method.

Advantageous Effects

According to the present disclosure, it is possible to increase overall image/video compression efficiency.

According to the present disclosure, it is possible to increase efficiency of LFNST index coding.

According to this document, efficiency of a secondary transform can be improved.

Effects that can be obtained through specific examples of the present specification are not limited to the effects listed above. For example, various technical effects that a person having ordinary skill in the related art can understand or derive from the present specification may exist. Accordingly, specific effects of the present specification are not limited to those explicitly described in the present specification, and can include various effects that can be understood or derived from the technical characteristics of the present specification.

BRIEF DESCRIPTION OF THE DRAWINGS

FIG. 8 is a diagram illustrating a sequence of arranging output data of a forward primary transformation into a one-dimensional vector according to an example.

FIG. 9 is a diagram illustrating a sequence of arranging output data of a forward secondary transform into a two-dimensional block according to an example.

FIG. 13 is a diagram illustrating zero-out in a block to which 4×4 LFNST is applied according to an example.

FIG. 14 is a diagram illustrating zero-out in a block to which 8×8 LFNST is applied according to an example.

DESCRIPTION OF EXEMPLARY EMBODIMENTS

Figure 1:
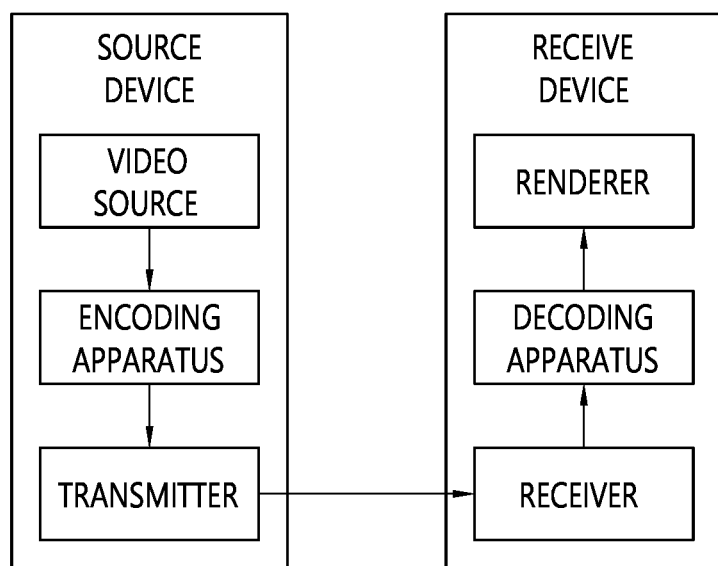
FIG. 1 schematically illustrates an example of a video/image coding system to which the present disclosure is applicable.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pa may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of" A and B.

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". In other words, the "prediction" of the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
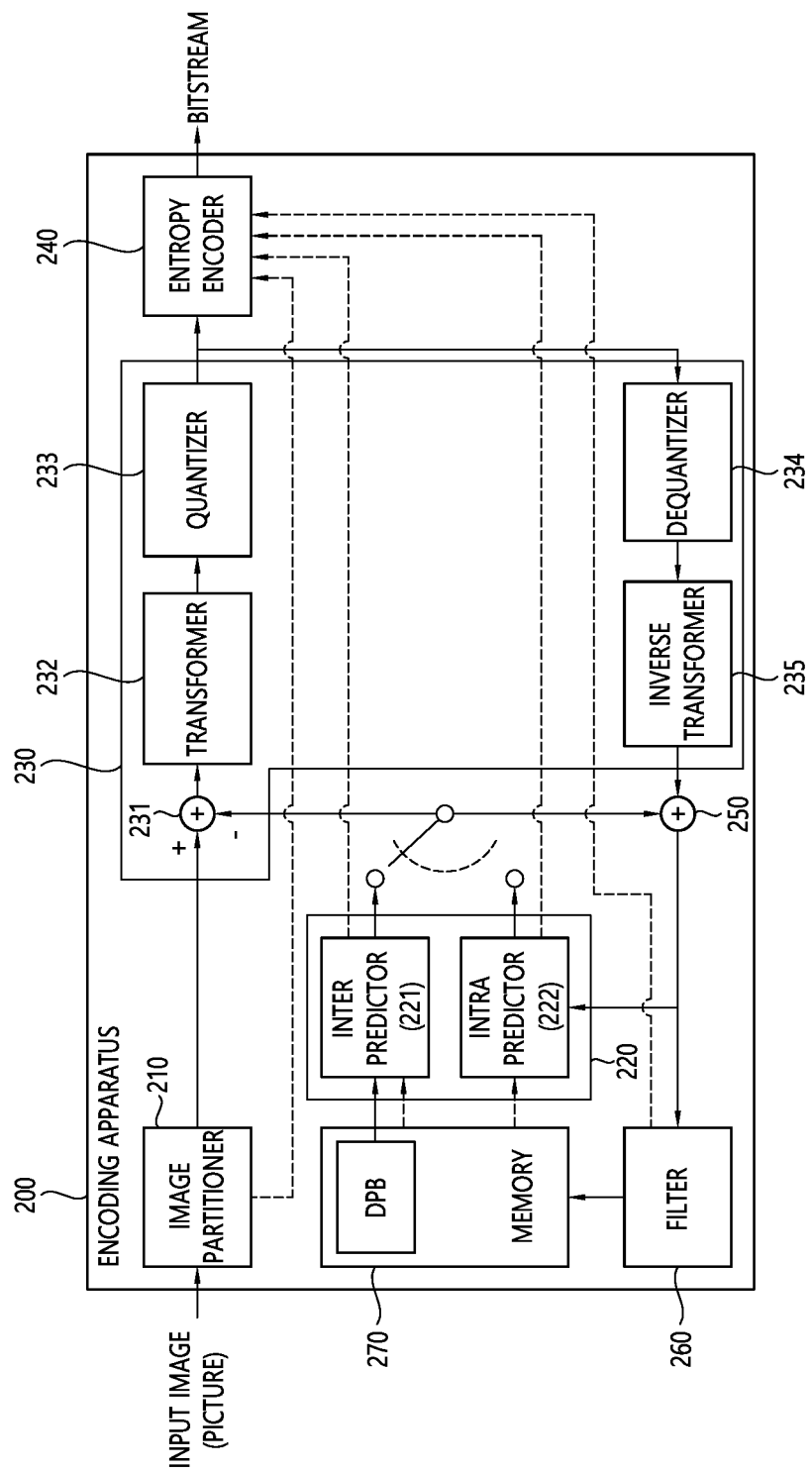
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtractes a prediction signal (predicted block, prediction sample array) output from the predictor 220 from an input image signal (original block, original sample array) to generate a residual signal (residual block, residual sample array), and the generated residual signal is transmitted to the transformer 232. The predictor 220 may perform prediction on a processing target block (hereinafter, referred to as 'current block'), and may generate a predicted block including prediction samples for the current block. The predictor 220 may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loeve transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
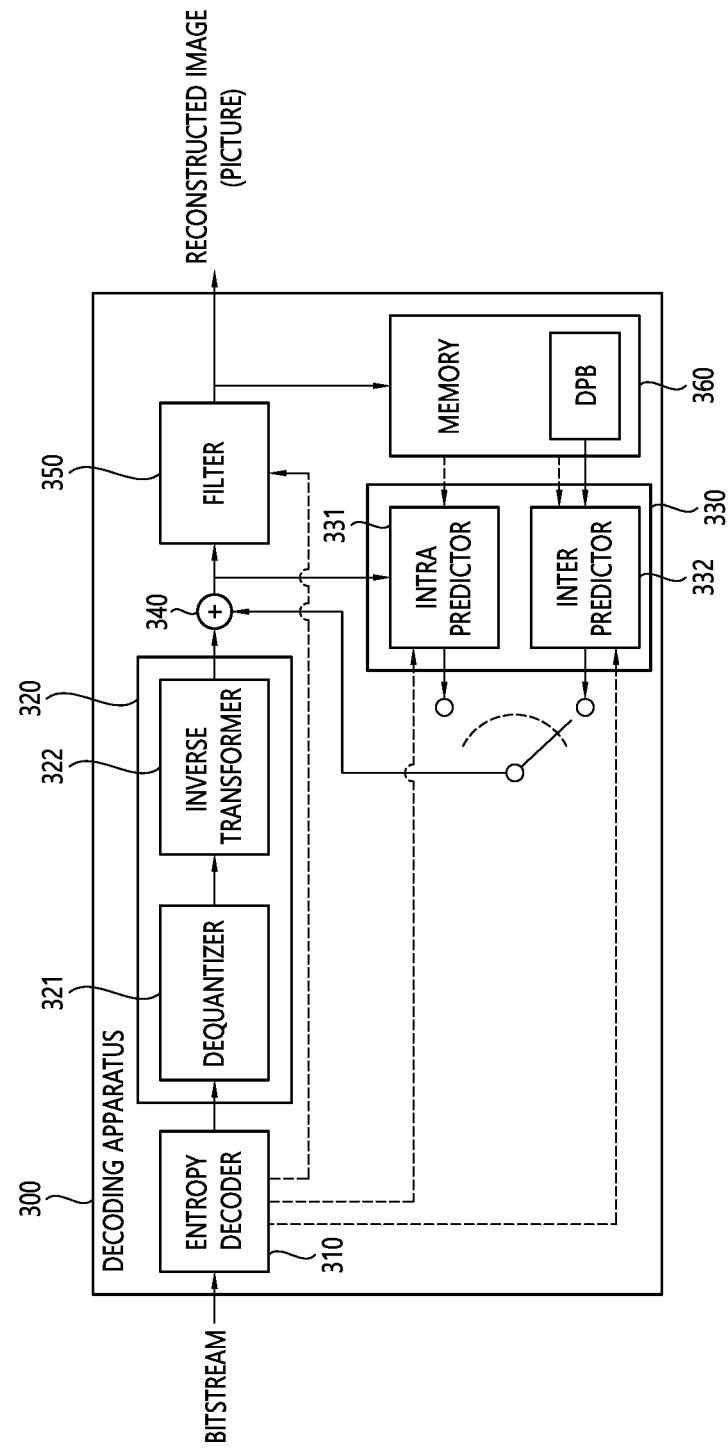
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The deqauntizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
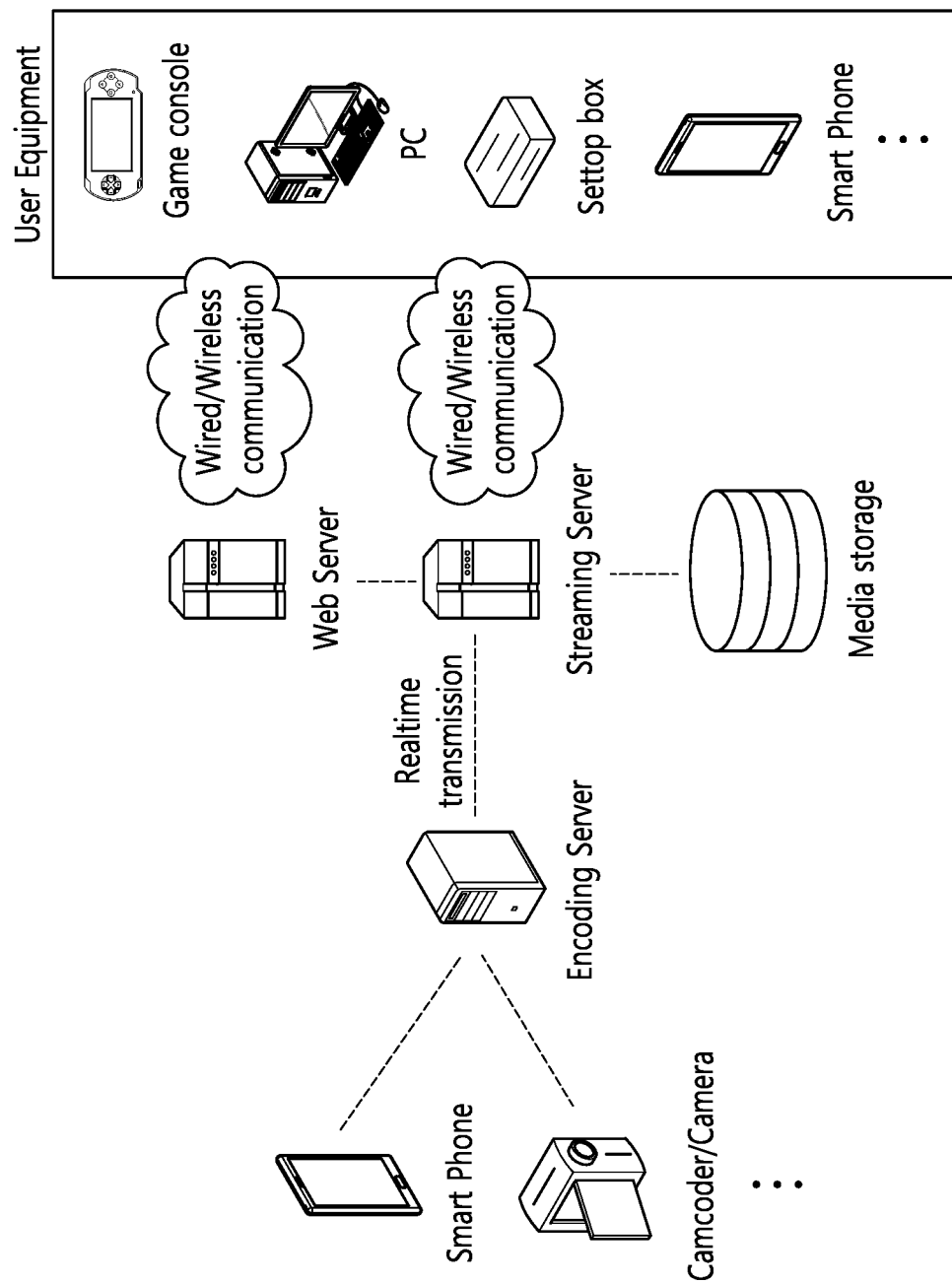
FIG. 4 exemplarily illustrates a diagram of a content streaming system structure to which this document is applied.

FIG. 4 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

Figure 5:
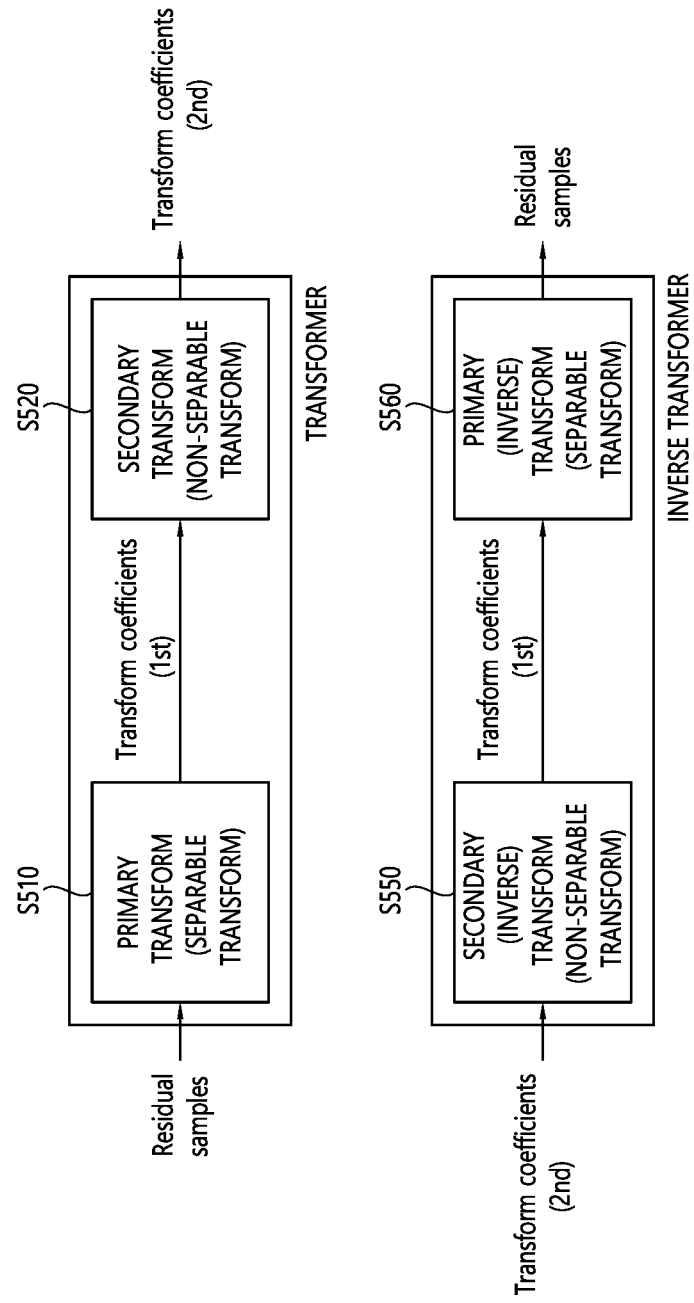
FIG. 5 is schematically illustrates a multiple transform scheme according to an embodiment of the present document.

FIG. 5 schematically illustrates a multiple transform technique according to an embodiment of the present disclosure.

Referring to FIG. 5, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S510). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

In other words, when the conventional transform method is applied, transform coefficients might be generated by applying transform from a space domain to a frequency domain for a residual signal (or residual block) based on the DCT type 2. Unlike to this, when the multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. Herein, the DCT type 2, the DST type 7, the DCT type 8, and the DST type 1 may be called a transform type, transform kernel or transform core. These DCT/DST transform types can be defined based on basis functions.

When the multiple core transform is performed, a vertical transform kernel and a horizontal transform kernel for a target block may be selected from among the transform kernels, a vertical transform may be performed on the target block based on the vertical transform kernel, and a horizontal transform may be performed on the target block based on the horizontal transform kernel. Here, the horizontal transform may indicate a transform on horizontal components of the target block, and the vertical transform may indicate a transform on vertical components of the target block. The vertical transform kernel/horizontal transform kernel may be adaptively determined based on a prediction mode and/or a transform index for the target block (CU or subblock) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST7, and a trTypeHor or trTypeVer value of 2 may be set to DCT8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both trTypeHor and trTypeVer values are 2.

In one example, transform kernel sets according to MTS index information are illustrated in the following table.

TABLE 1

| tu_mts_idx[x0][y0] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may perform a secondary transform based on the (primary) transform coefficients to derive modified (secondary) transform coefficients (S520). The primary transform is a transform from a spatial domain to a frequency domain, and the secondary transform refers to transforming into a more compact expression using a correlation existing between (primary) transform coefficients. The secondary transform may include a non-separable transform. In this case, the secondary transform may be referred to as a non-separable secondary transform (NSST) or a mode-dependent non-separable secondary transform (MDNSST). The NSST may represent a transform that secondarily transforms (primary) transform coefficients derived through the primary transform based on a non-separable transform matrix to generate modified transform coefficients (or secondary transform coefficients) for a residual signal. Here, the transform may be applied at once without separating (or independently applying a horizontal/vertical transform) a vertical transform and a horizontal transform to the (primary) transform coefficients based on the non-separable transform matrix. In other words, the NSST is not separately applied to the (primary) transform coefficients in a vertical direction and a horizontal direction, and may represent, for example, a transform method of rearranging two-dimensional signals (transform coefficients) into a one-dimensional signal through a specific predetermined direction (e.g., row-first direction or column-first direction) and then generating modified transform coefficients (or secondary transform coefficients) based on the non-separable transform matrix. For example, a row-first order is to dispose in a line in order of a 1st row, a 2nd row, ..., an Nth row for M×N blocks, and a column-first order is to dispose in a line in order of a 1st column, a 2nd column, ..., an Mth column for M×N blocks. The NSST may be applied to a top-left region of a block (hereinafter, referred to as a transform coefficient block) configured with (primary) transform coefficients. For example, when both a width W and height H of the transform coefficient block are 8 or more, an 8×8 NSST may be applied to the top-left 8×8 region of the transform coefficient block. Further, while both the width (W) and height (H) of the transform coefficient block are 4 or more, when the width (W) or height (H) of the transform coefficient block is smaller than 8, 4×4 NSST may be applied to the top-left min(8,W)×min(8,H) region of the transform coefficient block. However, the embodiment is not limited thereto, and for example, even if only the condition that the width W or the height H of the transform coefficient block is 4 or greater is satisfied, the 4×4 NSST may be applied to the top-left end min(8,W)×min(8,H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$ [Equation 1]

If the X is represented in the form of a vector, the vector $\vec{X}$ (may be represented as below.

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]T$$ [Equation 2]

In Equation 2, the vector X is a one-dimensional vector obtained by rearranging the two-dimensional block X of Equation 1 according to the row-first order.

In this case, the secondary non-separable transform may be calculated as below.

$$\vec{F} = T \cdot \vec{X}$$ [Equation 3]

In this equation, $\vec{F}$ represents a transform coefficient vector, and T represents a 16×16 (non-separable) transform matrix.

Through foregoing Equation 3, a 16×1 transform coefficient vector $\vec{F}$ may be derived, and the P may be reorganized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected to be mode-dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. The 8×8 transform refers to a transform that is applicable to an 8×8 region included in the transform coefficient block when both W and H are equal to or greater than 8, and the 8×8 region may be a top-left 8×8 region in the transform coefficient block. Similarly, the 4×4 transform refers to a transform that is applicable to a 4×4 region included in the transform coefficient block when both W and H are equal to or greater than 4, and the 4×4 region may be a top-left 4×4 region in the transform coefficient block. For example, an 8×8 transform kernel matrix may be a 64×64/16×64 matrix, and a 4×4 transform kernel matrix may be a 16×16/8×16 matrix.

Here, to select a mode-dependent transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform, which will be described later, and represents a non-separable transform for a low frequency component.

For reference, for example, the intra prediction mode may include two non-directional (or non-angular) intra prediction modes and 65 directional (or angular) intra prediction modes. The non-directional intra prediction modes may include a planar intra prediction mode of No. 0 and a DC intra prediction mode of No. 1, and the directional intra prediction modes may include 65 intra prediction modes of Nos. 2 to 66. However, this is an example, and this document may be applied even when the number of intra prediction modes is different. Meanwhile, in some cases, intra prediction mode No. 67 may be further used, and the intra prediction mode No. 67 may represent a linear model (LM) mode.

Figure 6:
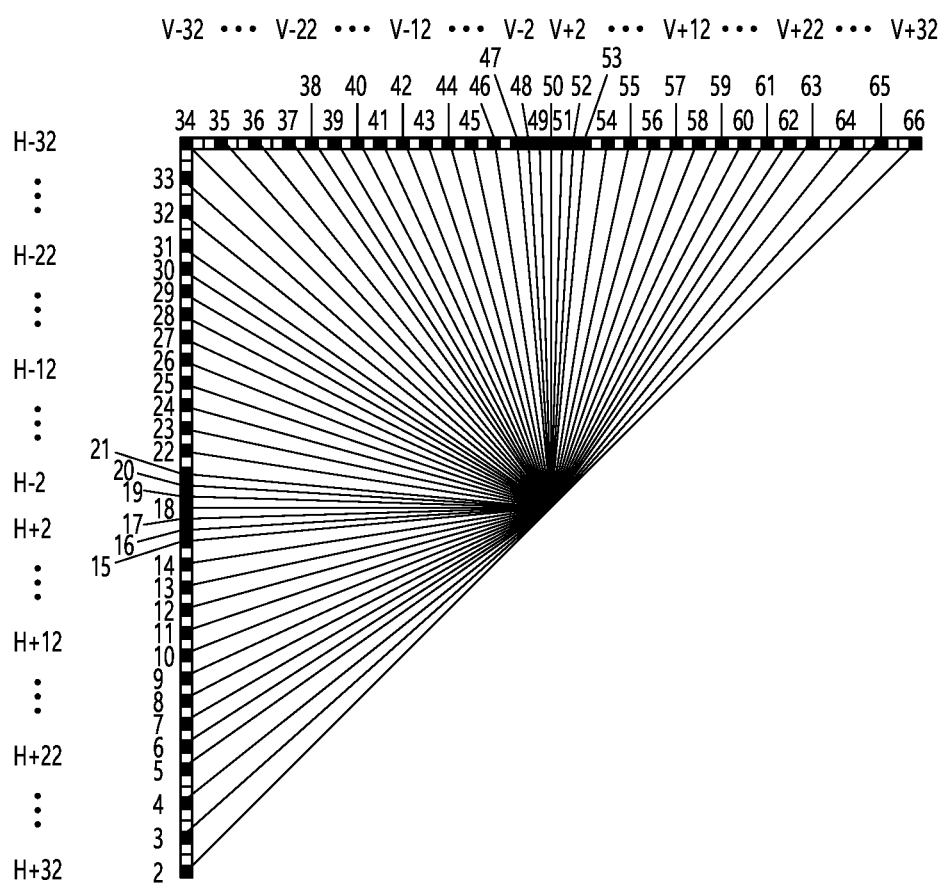
FIG. 6 exemplarily shows intra directional modes of 65 prediction directions.

FIG. 6 exemplarily shows intra directional modes of 65 prediction directions.

Referring to FIG. 6, on the basis of intra prediction mode 34 having a left upward diagonal prediction direction, the intra prediction modes may be divided into intra prediction modes having horizontal directionality and intra prediction modes having vertical directionality. In FIGS. 6, H and V denote horizontal directionality and vertical directionality, respectively, and numerals −32 to 32 indicate displacements in 1/32 units on a sample grid position. These numerals may represent an offset for a mode index value. Intra prediction modes 2 to 33 have the horizontal directionality, and intra prediction modes 34 to 66 have the vertical directionality. Strictly speaking, intra prediction mode 34 may be considered as being neither horizontal nor vertical, but may be classified as belonging to the horizontal directionality in determining a transform set of a secondary transform. This is because input data is transposed to be used for a vertical direction mode symmetrical on the basis of intra prediction mode 34, and an input data alignment method for a horizontal mode is used for intra prediction mode 34. Transposing input data means that rows and columns of two-dimensional M×N block data are switched into N×M data. Intra prediction mode 18 and intra prediction mode 50 may represent a horizontal intra prediction mode and a vertical intra prediction mode, respectively, and intra prediction mode 2 may be referred to as a right upward diagonal intra prediction mode because intra prediction mode 2 has a left reference pixel and performs prediction in a right upward direction. Likewise, intra prediction mode 34 may be referred to as a right downward diagonal intra prediction mode, and intra prediction mode 66 may be referred to as a left downward diagonal intra prediction mode.

According to an example, the four transform sets according to the intra prediction mode may be mapped, for example, as shown in the following table.

TABLE 2

| lfnstPredModeIntra | lfnstTrSetIdx |
|---|---|
| lfnstPredModeIntra <0 | 1 |
| 0<= lfnstPredModeIntra <=1 | 0 |
| 2<= lfnstPredModeIntra <=12 | 1 |
| 13<= lfnstPredModeIntra <=23 | 2 |
| 24<= lfnstPredModeIntra <=44 | 3 |
| 45<= lfnstPredModeIntra <=55 | 2 |
| 56<= lfnstPredModeIntra <=80 | 1 |
| 81<= lfnstPredModeIntra <=83 | 0 |

As shown in Table 2, any one of the four transform sets, that is, lfnstTrSetIdx, may be mapped to any one of four indexes, that is, 0 to 3, according to the intra prediction mode.

When it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, lfnst index value 0 may refer to a first non-separable secondary transform kernel, lfnst index value 1 may refer to a second non-separable secondary transform kernel, and lfnst index value 2 may refer to a third non-separable secondary transform kernel. Alternatively, lfnst index value 0 may indicate that the first non-separable secondary transform is not applied to the target block, and lfnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S550), and may obtain a residual block (residual samples) by performing a primary (inverse) transform on the (primary) transform coefficients (S560). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST, an RST, or an LFNST and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an LFNST (NSST or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform.

Meanwhile, the transform kernel, the transform matrix, and the coefficient constituting the transform kernel matrix, that is, the kernel coefficient or the matrix coefficient, described in the present disclosure may be expressed in 8 bits. This may be a condition for implementation in the decoding apparatus and the encoding apparatus, and may reduce the amount of memory required to store the transform kernel with a performance degradation that can be reasonably accommodated compared to the existing 9 bits or 10 bits. In addition, the expressing of the kernel matrix in 8 bits may allow a small multiplier to be used, and may be more suitable for single instruction multiple data (SIMD) instructions used for optimal software implementation.

In the present specification, the term "RST" may mean a transform which is performed on residual samples for a target block based on a transform matrix whose size is reduced according to a reduced factor. In the case of performing the reduced transform, the amount of computation required for transform may be reduced due to a reduction in the size of the transform matrix. That is, the RST may be used to address the computational complexity issue occurring at the non-separable transform or the transform of a block of a great size.

RST may be referred to as various terms, such as reduced transform, reduced secondary transform, reduction transform, simplified transform, simple transform, and the like, and the name which RST may be referred to as is not limited to the listed examples. Alternatively, since the RST is mainly performed in a low frequency region including a non-zero coefficient in a transform block, it may be referred to as a Low-Frequency Non-Separable Transform (LFNST). The transform index may be referred to as an LFNST index.

Meanwhile, when the secondary inverse transform is performed based on RST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual. In the present disclosure, deriving a transform coefficient based on a transform may refer to deriving a transform coefficient by applying the transform.

Figure 7:
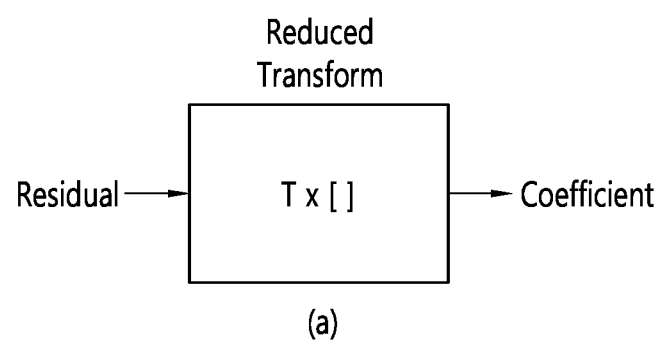
FIG. 7 is a diagram for explaining RST according to an embodiment of the present.
Figure 7:
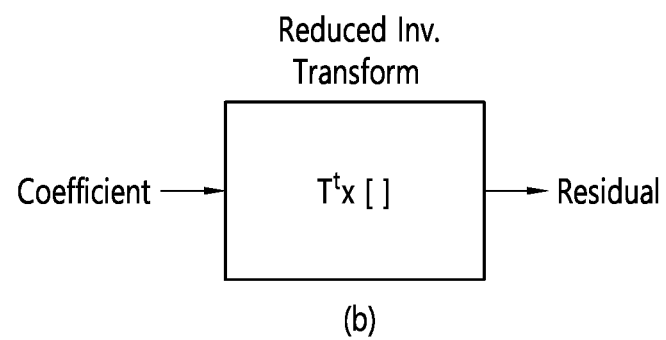

FIG. 7 is a diagram illustrating an RST according to an embodiment of the present disclosure.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 200 and the decoding apparatus 300, and in this case, the reduced factor or the reduced coefficient may not be signaled separately.

The size of the reduced transform matrix according to an example may be R×N less than N×N, the size of a conventional transform matrix, and may be defined as in Equation 4 below.

$$T_{RxN} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \quad \text{[Equation 4]}$$

The matrix T in the Reduced Transform block shown in (a) of FIG. 7 may mean the matrix TR×N of Equation 4. As shown in (a) of FIG. 7, when the reduced transform matrix TR×N is multiplied to residual samples for the target block, transform coefficients for the target block may be derived.

In an example, if the size of the block to which the transform is applied is 8×8 and R=16 (i.e., R/N=16/64=¼), then the RST according to (a) of FIG. 7 may be expressed as a matrix operation as shown in Equation 5 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & \cdots & t_{1,64} \\ t_{2,1} & t_{2,2} & t_{2,3} & & t_{2,64} \\ \vdots & & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix} \quad \text{[Equation 5]}$$

In Equation 5, r1 to r64 may represent residual samples for the target block and may be specifically transform coefficients generated by applying a primary transform. As a result of the calculation of Equation 5 transform coefficients ci for the target block may be derived, and a process of deriving ci may be as in Equation 6.

[Equation 6]

for i from to R:
  ci=0
  for j from 1 to N
    ci += tij * rj

As a result of the calculation of Equation 6, transform coefficients c1 to cR for the target block may be derived. That is, when R=16, transform coefficients c1 to c16 for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the RST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix TN×R according to an example is N×R less than the size N×N of the regular inverse transform matrix, and is in a transpose relationship with the reduced transform matrix TR×N shown in Equation 4.

The matrix Tt in the Reduced Inv. Transform block shown in (b) of FIG. 7 may mean the inverse RST matrix TR×NT (the superscript T means transpose). When the inverse RST matrix TR×NT is multiplied to the transform coefficients for the target block as shown in (b) of FIG. 7, the modified transform coefficients for the target block or the residual samples for the current block may be derived. The inverse RST matrix TR×NT may be expressed as (TR×N) TN×R.

More specifically, when the inverse RST is applied as the secondary inverse transform, the modified transform coefficients for the target block may be derived when the inverse RST matrix TR×NT is multiplied to the transform coefficients for the target block. Meanwhile, the inverse RST may be applied as the inverse primary transform, and in this case, the residual samples for the target block may be derived when the inverse RST matrix TR×NT is multiplied to the transform coefficients for the target block.

In an example, if the size of the block to which the inverse transform is applied is 8×8 and R=16 (i.e., R/N=16/64=¼), then the RST according to (b) of FIG. 7 may be expressed as a matrix operation as shown in Equation 7 below.

$$\begin{bmatrix} t_{1,1} & t_{2,1} & \cdots & t_{16,1} \\ t_{1,2} & t_{2,2} & \cdots & t_{16,2} \\ t_{1,3} & t_{2,3} & \cdots & t_{16,3} \\ \vdots & \vdots & & \vdots \\ & \vdots & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix}$$ [Equation 7]

In Equation 7, c1 to c16 may represent the transform coefficients for the target block. As a result of the calculation of Equation 7, ri representing the modified transform coefficients for the target block or the residual samples for the target block may be derived, and the process of deriving ri may be as in Equation 8.

[Equation 8]
For i from 1 to N
  $r_i$=0
  for j from 1 to R
    $r_i$ +=tji * cj As a result of the calculation of Equation 8, r1 to rN representing the modified transform coefficients for the target block or the residual samples for the target block may be derived. When considered from the viewpoint of the size of the inverse transform matrix, the size of the regular inverse transform matrix is 64×64 (N×N), but the size of the reduced inverse transform matrix is reduced to 64×16 (R×N), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

A transform set configuration shown in Table 2 may also be applied to an 8×8 RST. That is, the 8×8 RST may be applied according to a transform set in Table 2. Since one transform set includes two or three transforms (kernels) according to an intra prediction mode, it may be configured to select one of up to four transforms including that in a case where no secondary transform is applied. In a transform where no secondary transform is applied, it may be considered to apply an identity matrix. Assuming that indexes 0, 1, 2, and 3 are respectively assigned to the four transforms (e.g., index 0 may be allocated to a case where an identity matrix is applied, that is, a case where no secondary transform is applied), a transform index or an lfnst index as a syntax element may be signaled for each transform coefficient block, thereby designating a transform to be applied. That is, for a top-left 8×8 block, through the transform index, it is possible to designate an 8×8 RST in an RST configuration, or to designate an 8×8 lfnst when the LFNST is applied. The 8×8 lfnst and the 8×8 RST refer to transforms applicable to an 8×8 region included in the transform coefficient block when both W and H of the target block to be transformed are equal to or greater than 8, and the 8×8 region may be a top-left 8×8 region in the transform coefficient block. Similarly, a 4×4 lfnst and a 4×4 RST refer to transforms applicable to a 4×4 region included in the transform coefficient block when both W and H of the target block to are equal to or greater than 4, and the 4×4 region may be a top-left 4×4 region in the transform coefficient block.

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m ×48 transform kernel matrix for generating m coefficients. That is, when an RST is performed by applying an m ×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. Here, the 48 pieces of data forming the 8×8 region may be properly arranged, thereby forming the 48×1 vector. For example, a 48×1 vector may be constructed based on 48 pieces of data constituting a region excluding the bottom right 4×4 region among the 8×8 regions. Here, when a matrix operation is performed by applying a maximum 16×48 transform kernel matrix, 16 modified transform coefficients are generated, and the 16 modified transform coefficients may be arranged in a top-left 4×4 region according to a scanning order, and a top-right 4×4 region and a bottom-left 4×4 region may be filled with zeros.

For an inverse transform in a decoding process, the transposed matrix of the foregoing transform kernel matrix may be used. That is, when an inverse RST or LFNST is performed in the inverse transform process performed by the decoding apparatus, input coefficient data to which the inverse RST is applied is configured in a one-dimensional vector according to a predetermined arrangement order, and a modified coefficient vector obtained by multiplying the one-dimensional vector and a corresponding inverse RST matrix on the left of the one-dimensional vector may be arranged in a two-dimensional block according to a predetermined arrangement order.

In summary, in the transform process, when an RST or LFNST is applied to an 8×8 region, a matrix operation of 48 transform coefficients in top-left, top-right, and bottom-left regions of the 8×8 region excluding the bottom-right region among transform coefficients in the 8×8 region and a 16×48 transform kernel matrix. For the matrix operation, the 48 transform coefficients are input in a one-dimensional array. When the matrix operation is performed, 16 modified transform coefficients are derived, and the modified transform coefficients may be arranged in the top-left region of the 8×8 region.

On the contrary, in the inverse transform process, when an inverse RST or LFNST is applied to an 8×8 region, 16 transform coefficients corresponding to a top-left region of the 8×8 region among transform coefficients in the 8×8 region may be input in a one-dimensional array according to a scanning order and may be subjected to a matrix operation with a 48×16 transform kernel matrix. That is, the matrix operation may be expressed as (48×16 matrix)*(16×1 transform coefficient vector)=(48×1 modified transform coefficient vector). Here, an n ×1 vector may be interpreted to have the same meaning as an n×1 matrix and may thus be expressed as an n×1 column vector. Further, * denotes matrix multiplication. When the matrix operation is performed, 48 modified transform coefficients may be derived, and the 48 modified transform coefficients may be arranged in top-left, top-right, and bottom-left regions of the 8×8 region excluding a bottom-right region.

When a secondary inverse transform is based on an RST, the inverse transformer 235 of the encoding apparatus 200 and the inverse transformer 322 of the decoding apparatus 300 may include an inverse reduced secondary transformer to derive modified transform coefficients based on an inverse RST on transform coefficients and an inverse primary transformer to derive residual samples for the target block based on an inverse primary transform on the modified transform coefficients. The inverse primary transform refers to the inverse transform of a primary transform applied to a residual. In the present disclosure, deriving a transform coefficient based on a transform may refer to deriving the transform coefficient by applying the transform.

The above-described non-separated transform, the LFNST, will be described in detail as follows. The LFNST may include a forward transform by the encoding apparatus and an inverse transform by the decoding apparatus.

The encoding apparatus receives a result (or a part of a result) derived after applying a primary (core) transform as an input, and applies a forward secondary transform (secondary transform).

$$y = G^T x \qquad \text{[Equation 9]}$$

In Equation 9, x and y are inputs and outputs of the secondary transform, respectively, and G is a matrix representing the secondary transform, and transform basis vectors are composed of column vectors. In the case of an inverse LFNST, when the dimension of the transformation matrix G is expressed as [number of rows x number of columns], in the case of an forward LFNST, the transposition of matrix G becomes the dimension of GT.

For the inverse LFNST, the dimensions of matrix G are [48×16], [48×8], [16×16], [16×8], and the [48×8] matrix and the [16×8] matrix are partial matrices that sampled 8 transform basis vectors from the left of the [48×16] matrix and the [16×16] matrix, respectively.

On the other hand, for the forward LFNST, the dimensions of matrix GT are [16×48], [8×48], [16×16], [8×16], and the [8×48] matrix and the[8×16] matrix are partial matrices obtained by sampling 8 transform basis vectors from the top of the [16×48] matrix and the [16×16] matrix, respectively.

Therefore, in the case of the forward LFNST, a [48×1] vector or [16×1] vector is possible as an input x, and a [16×1] vector or a [8×1] vector is possible as an output y. In video coding and decoding, the output of the forward primary transform is two-dimensional (2D) data, so to construct the [48×1] vector or the [16×1] vector as the input x, a one-dimensional vector must be constructed by properly arranging the 2D data that is the output of the forward transformation.

FIG. 8 is a diagram illustrating a sequence of arranging output data of a forward primary transformation into a one-dimensional vector according to an example. The left diagrams of (a) and (b) of FIG. 8 show the sequence for constructing a 48×1 vector, and the right diagrams of (a) and (b) of FIG. 8 shows the sequence for constructing a 16×1 vector. In the case of the LFNST, a one-dimensional vector x can be obtained by sequentially arranging 2D data in the same order as in (a) and (b) of FIG. 8.

The arrangement direction of the output data of the forward primary transform may be determined according to an intra prediction mode of the current block. For example, when the intra prediction mode of the current block is in the horizontal direction with respect to the diagonal direction, the output data of the forward primary transform may be arranged in the order of (a) of FIG. 8, and when the intra prediction mode of the current block is in the vertical direction with respect to the diagonal direction, the output data of the forward primary transform may be arranged in the order of (b) of FIG. 8.

According to an example, an arrangement order different from the arrangement orders of (a) and (b) FIG. 8 may be applied, and in order to derive the same result (y vector) as when the arrangement orders of (a) and (b) FIG. 8 is applied, the column vectors of the matrix G may be rearranged according to the arrangement order. That is, it is possible to rearrange the column vectors of G so that each element constituting the x vector is always multiplied by the same transform basis vector.

Since the output y derived through Equation 9 is a one-dimensional vector, when two-dimensional data is required as input data in the process of using the result of the forward secondary transformation as an input, for example, in the process of performing quantization or residual coding, the output y vector of Equation 9 must be properly arranged as 2D data again.

Figure 9:
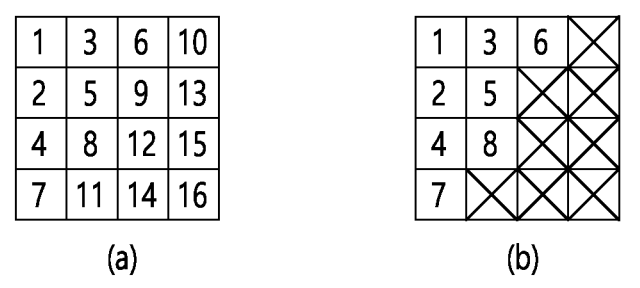

FIG. 9 is a diagram illustrating a sequence of arranging output data of a forward secondary transform into a two-dimensional block according to an example.

In the case of the LFNST, output values may be arranged in a 2D block according to a predetermined scan order. (a) of FIG. 9 shows that when the output y is a [16×1] vector, the output values are arranged at 16 positions of the 2D block according to a diagonal scan order. (b) of FIG. 9 shows that when the output y is a [8×1] vector, the output values are arranged at 8 positions of the 2D block according to the diagonal scan order, and the remaining 8 positions are filled with zeros. X in (b) of FIG. 9 indicates that it is filled with zero.

According to another example, since the order in which the output vector y is processed in performing quantization or residual coding may be preset, the output vector y may not be arranged in the 2D block as shown in FIG. 9. However, in the case of the residual coding, data coding may be performed in 2D block (eg, 4×4) units such as CG (Coefficient Group), and in this case, the data are arranged according to a specific order as in the diagonal scan order of FIG. 9.

Meanwhile, the decoding apparatus may configure the one-dimensional input vector y by arranging two-dimensional data output through a dequantization process or the like according to a preset scan order for the inverse transformation. The input vector y may be output as the output vector x by the following equation.

$$x = Gy \qquad \text{[Equation 10]}$$

In the case of the inverse LFNST, an output vector x can be derived by multiplying an input vector y, which is a [16×1] vector or a [8×1] vector, by a G matrix. For the inverse LFNST, the output vector x can be either a [48×1] vector or a [16×1] vector.

The output vector x is arranged in a two-dimensional block according to the order shown in FIG. 8 and is arranged as two-dimensional data, and this two-dimensional data becomes input data (or a part of input data) of the inverse primary transformation.

Accordingly, the inverse secondary transformation is the opposite of the forward secondary transformation process as a whole, and in the case of the inverse transformation, unlike in the forward direction, the inverse secondary transformation is first applied, and then the inverse primary transformation is applied.

In the inverse LFNST, one of 8 48×16 matrices and 8 16×16 matrices may be selected as the transformation matrix G. Whether to apply the 48×16 matrix or the 16×16 matrix depends on the size and shape of the block.

In addition, 8 matrices may be derived from four transform sets as shown in Table 2 above, and each transform set may consist of two matrices. Which transform set to use among the 4 transform sets is determined according to the intra prediction mode, and more specifically, the transform set is determined based on the value of the intra prediction mode extended by considering the Wide Angle Intra Prediction (WAIP). Which matrix to select from among the two matrices constituting the selected transform set is derived through index signaling. More specifically, 0, 1, and 2 are possible as the transmitted index value, 0 may indicate that the LFNST is not applied, and 1 and 2 may indicate any one of two transform matrices constituting a transform set selected based on the intra prediction mode value.

Figure 10:
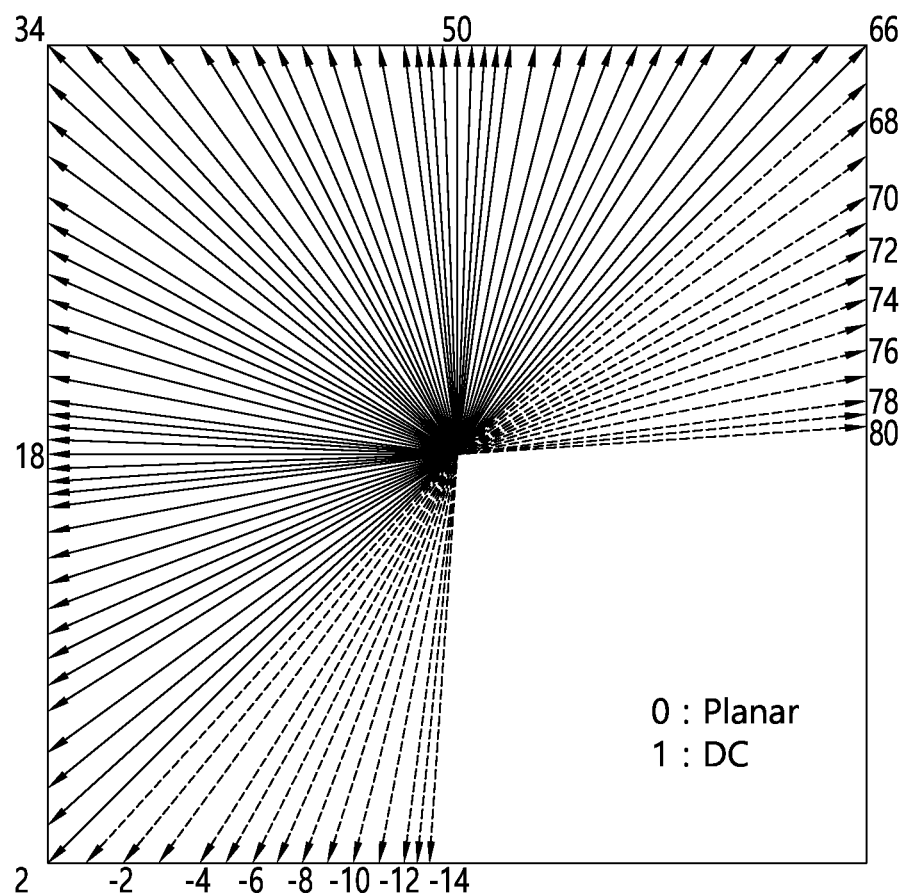
FIG. 10 is a diagram illustrating wide-angle intra prediction modes according to an embodiment of the present document.

FIG. 10 is a diagram illustrating wide-angle intra prediction modes according to an embodiment of the present document.

The general intra prediction mode value may have values from 0 to 66 and 81 to 83, and the intra prediction mode value extended due to WAIP may have a value from −14 to 83 as shown. Values from 81 to 83 indicate the CCLM (Cross Component Linear Model) mode, and values from −14 to −1 and values from 67 to 80 indicate the intra prediction mode extended due to the WAIP application.

When the width of the prediction current block is greater than the height, the upper reference pixels are generally closer to positions inside the block to be predicted. Therefore, it may be more accurate to predict in the bottom-left direction than in the top-right direction. Conversely, when the height of the block is greater than the width, the left reference pixels are generally close to positions inside the block to be predicted. Therefore, it may be more accurate to predict in the top-right direction than in the bottom-left direction. Therefore, it may be advantageous to apply remapping, i.e., mode index modification, to the index of the wide-angle intra prediction mode.

When the wide-angle intra prediction is applied, information on the existing intra prediction may be signaled, and after the information is parsed, the information may be remapped to the index of the wide-angle intra prediction mode. Therefore, the total number of the intra prediction modes for a specific block (eg, a non-square block of a specific size) may not change, and that is, the total number of the intra prediction modes is 67, and intra prediction mode coding for the specific block may not be changed.

Table 3 below shows a process of deriving a modified intra mode by remapping the intra prediction mode to the wide-angle intra prediction mode.

TABLE 3

Inputs to this process are:
- a variable preModeIntra specifying the intra prediction mode,
- a variable nTbW specifying the transform block width,
- a variable nTbH specifying the transform block height,
- a variable cIdx specifying the colour component of the current block.
Output of this process is the modified intra prediction node preModeIntra.
The variables nW and nH are derived as follows:
- If IntraSubPartitionsSplitType is equal to ISP_NO_SPLIT or cIdx is not equal to 0, the following applies:
   nW = nTW                                                                        (8-97)
   nH = nTbH                                                                (8-98)
- Otherwise ( IntraSubPartitionsSplitType is not equal to ISP_NO_SPLIT and cIdx is equal to 0 ), the following applies:
   nW = nCbW                                                             (8-99)
   nH = nCbH                                                          (8-100)
The variable whRatio is set equal to Abs( Log2( nW / nH ) ).
For non-square blocks (nW is not equal to nH), the intra prediction mode preModeIntra is modified as follows:
- If all of the following conditions are true, preModeIntra is set equal to ( preModeIntra + 65 ).
  - nW is greater than nH
  - preModeIntra is greater than or equal to 2
  - preModeIntra is less than ( whRatio > 1 ) ? ( 8 + 2 * whRatio ) : 8
- Otherwise, if all of the following conditions are true, preModeIntra is set equal to
  ( preModeIntra − 67 ).
  - nH is greater than nW
  - preModeIntra is less than or equal to 66
  - preModeIntra is greater than ( whRatio > 1 ) ? (60 − 2 * whRatio ) : 60

In Table 3, the extended intra prediction mode value is finally stored in the predModeIntra variable, and ISP_NO_SPLIT indicates that the CU block is not divided into sub-partitions by the Intra Sub Partitions (ISP) technique currently adopted in the VVC standard, and the cIdx variable Values of 0, 1, and 2 indicate the case of luma, Cb, and Cr components, respectively. Log 2 function shown in Table 3 returns a log value with a base of 2, and the Abs function returns an absolute value.

Variable predModeIntra indicating the intra prediction mode and the height and width of the transform block, etc. are used as input values of the wide angle intra prediction mode mapping process, and the output value is the modified intra prediction mode predModeIntra. The height and width of the transform block or the coding block may be the height and width of the current block for remapping of the intra prediction mode. At this time, the variable whRatio reflecting the ratio of the width to the width may be set to Abs(Log 2(nW/nH)).

For a non-square block, the intra prediction mode may be divided into two cases and modified.

First, if all conditions (1)-(3) are satisfied, (1) the width of the current block is greater than the height, (2) the intra prediction mode before modifying is equal to or greater than 2, (3) the intra prediction mode is less than the value derived from (8+2*whRatio) when the variable whRatio is greater than 1, and is less than 8 when the variable whRatio is less than or equal to 1 [predModeIntra is less than (whRatio >1)? (8+2*whRatio):8], the intra prediction mode is set to a value 65 greater than the intra prediction mode [predModeIntra is set equal to (predModeIntra+65)].

If different from the above, that is, follow conditions (1)-(3) are satisfied, (1) the height of the current block is greater than the width, (2) the intra prediction mode before modifying is less than or equal to 66, (3) the intra prediction mode is greater than the value derived from (60-2*whRatio) when the variable whRatio is greater than 1, and is greater than 60 when the variable whRatio is less than or equal to 1 [predModeIntra is greater than (whRatio >1)?(60-2*whRatio):60], the intra prediction mode is set to a value 67 smaller than the intra prediction mode [predModeIntra is set equal to (predModeIntra—67)].

Table 2 above shows how a transform set is selected based on the intra prediction mode value extended by the WAIP in the LFNST. As shown in FIG. 10, modes 14 to 33 and modes 35 to 80 are symmetric with respect to the prediction direction around mode 34. For example, mode 14 and mode 54 are symmetric with respect to the direction corresponding to mode 34. Therefore, the same transform set is applied to modes located in mutually symmetrical directions, and this symmetry is also reflected in Table 2.

Meanwhile, it is assumed that forward LFNST input data for mode 54 is symmetrical with the forward LFNST input data for mode 14. For example, for mode 14 and mode 54, the two-dimensional data is rearranged into one-dimensional data according to the arrangement order shown in (a) of FIG. 8 and (b) of FIG. 8, respectively. In addition, it can be seen that the patterns in the order shown in (a) of FIG. 8 and (b) of FIG. 8 are symmetrical with respect to the direction (diagonal direction) indicated by Mode 34.

Meanwhile, as described above, which transform matrix of the [48×16] matrix and the [16×16] matrix is applied to the LFNST is determined by the size and shape of the transform target block.

Figure 11:
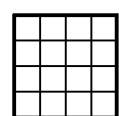
FIG. 11 is a diagram illustrating a block shape to which LFNST is applied.
Figure 11:
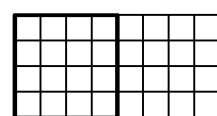
Figure 11:
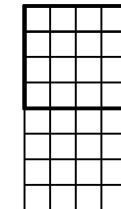
Figure 11:
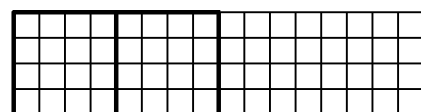
Figure 11:
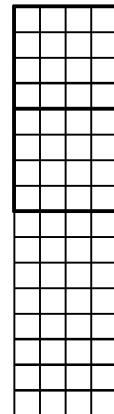
Figure 11:
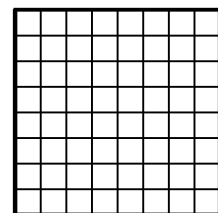
Figure 11:
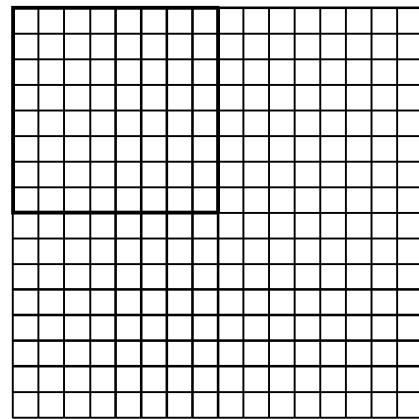

FIG. 11 is a diagram illustrating a block shape to which the LFNST is applied. (a) of FIG. 11 shows 4×4 blocks, (b) shows 4×8 and 8×4 blocks, (c) shows 4×N or N×4 blocks in which N is 16 or more, (d) shows 8×8 blocks, (e) shows M×N blocks where M≥8, N≥8, and N >8 or M >8.

In FIG. 11, blocks with thick borders indicate regions to which the LFNST is applied. For the blocks of (a) and (b) of FIG. 11, the LFNST is applied to the top-left 4×4 region, and for the block of (c) of FIG. 11, the LFNST is applied individually the two top-left 4×4 regions are continuously arranged. In (a), (b), and (c) of FIG. 11, since the LFNST is applied in units of 4×4 regions, this LFNST will be hereinafter referred to as "4×4 LFNST". Based on the matrix dimension for G, a [16×16] or [16×8] matrix may be applied.

More specifically, the [16×8] matrix is applied to the 4×4 block (4×4 TU or 4×4 CU) of (a) of FIG. 11 and the [16×16] matrix is applied to the blocks in (b) and (c) of FIG. 11. This is to adjust the computational complexity for the worst case to 8 multiplications per sample.

With respect to (d) and (e) of FIG. 11, the LFNST is applied to the top-left 8×8 region, and this LFNST is hereinafter referred to as "8×8 LFNST". As a corresponding transformation matrix, a [48×16] matrix or [48×8] matrix may be applied. In the case of the forward LFNST, since the [48×1] vector (x vector in Equation 9) is input as input data, all sample values of the top-left 8×8 region are not used as input values of the forward LFNST. That is, as can be seen in the left order of (a) of FIG. 8 or the left order of (b) of FIG. 8, the [48 ×1] vector may be constructed based on samples belonging to the remaining 3 4×4 blocks while leaving the bottom-right 4×4 block as it is.

The [48×8] matrix may be applied to an 8×8 block (8×8 TU or 8×8 CU) in (d) of FIG. 11, and the [48×16] matrix may be applied to the 8×8 block in (e) of FIG. 11. This is also to adjust the computational complexity for the worst case to 8 multiplications per sample.

Depending on the block shape, when the corresponding forward LFNST (4×4 LFNST or 8×8 LFNST) is applied, 8 or 16 output data (y vector in Equation 9, [8×1] or [16×1] vector) is generated. In the forward LFNST, the number of output data is equal to or less than the number of input data due to the characteristics of the matrix GT.

Figure 12:
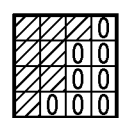
FIG. 12 is a diagram illustrating a disposition of output data of a forward LFNST according to an embodiment.
Figure 12:
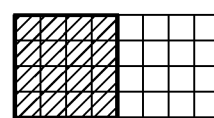
Figure 12:
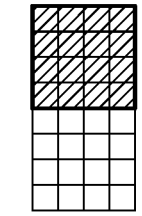
Figure 12:
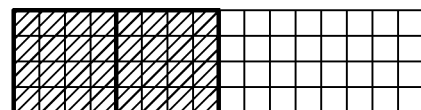
Figure 12:
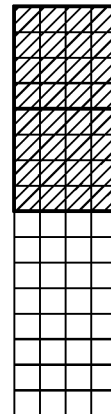
Figure 12:
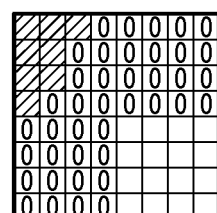
Figure 12:
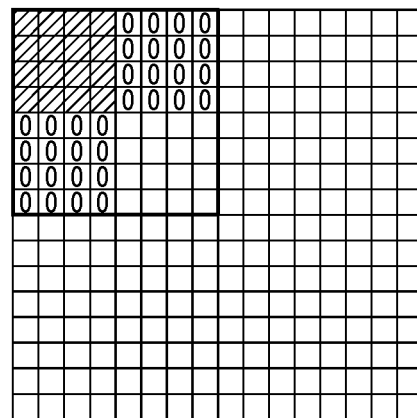

FIG. 12 is a diagram illustrating an arrangement of output data of a forward LFNST according to an example, and shows a block in which output data of the forward LFNST is arranged according to a block shape.

The shaded area at the top-left of the block shown in FIG. 12 corresponds to the area where the output data of the forward LFNST is located, the positions marked with 0 indicate samples filled with a value of 0, and the remaining area represents regions that are not changed by the forward LFNST. In the area not changed by the LFNST, the output data of the forward primary transform remains unchanged.

As described above, since the dimension of the transform matrix applied varies according to the shape of the block, the number of output data also varies. As FIG. 12, the output data of the forward LFNST may not completely fill the top-left 4×4 block. In the case of (a) and (d) of FIG. 12, a 16×8 matrix and a 48×8 matrix are applied to the block indicated by a thick line or a partial region inside the block, respectively, and a 8×1 vector as the output of the forward LFNST is generated. That is, according to the scan order shown in (b) of FIG. 9, only 8 output data may be filled as shown in (a) and (d) of FIG. 12, and 0 may be filled in the remaining 8 positions. In the case of the LFNST applied block of (d) of FIG. 11, as shown in (d) of FIG. 12, two 4×4 blocks in the top-right and bottom-left adjacent to the top-left 4×4 block are also filled with a value of 0.

As described above, basically, by signaling the LFNST index, whether to apply the LFNST and the transform matrix to be applied are specified. As shown FIG. 12, when the LFNST is applied, since the number of output data of the forward LFNST may be equal to or less than the number of input data, a region filled with a zero value occurs as follows.

1) As shown in (a) of FIG. 12, samples from the 8th and later positions in the scan order in the top-left 4×4 block, that is, samples from the 9th to the 16th.

2) As shown in (d) and (e) of FIG. 12, when the 48×16 matrix or the 48×8 matrix is applied, two 4×4 blocks adjacent to the top-left 4×4 block or the second and third 4×4 blocks in the scan order.

Therefore, if non-zero data exists by checking the areas 1) and 2), it is certain that the LFNST is not applied, so that the signaling of the corresponding LFNST index can be omitted.

According to an example, for example, in the case of LFNST adopted in the VVC standard, since signaling of the LFNST index is performed after the residual coding, the encoding apparatus may know whether there is the non-zero data (significant coefficients) for all positions within the TU or CU block through the residual coding. Accordingly, the encoding apparatus may determine whether to perform signaling on the LFNST index based on the existence of the non-zero data, and the decoding apparatus may determine whether the LFNST index is parsed. When the non-zero data does not exist in the area designated in 1) and 2) above, signaling of the LFNST index is performed.

Meanwhile, for the adopted LFNST, the following simplification methods may be applied.

(i) According to an example, the number of output data for the forward LFNST may be limited to a maximum of 16.

In the case of (c) of FIG. 11, the 4×4 LFNST may be applied to two 4×4 regions adjacent to the top-left, respectively, and in this case, a maximum of 32 LFNST output data may be generated. when the number of output data for forward LFNST is limited to a maximum of 16, in the case of 4×N/N×4 (N>16) blocks (TU or CU), the 4×4 LFNST is only applied to one 4×4 region in the top-left, the LFNST may be applied only once to all blocks of FIG. 11. Through this, the implementation of image coding may be simplified.

(ii) According to an example, zero-out may be additionally applied to a region to which the LFNST is not applied. In this document, the zero-out may mean filling values of all positions belonging to a specific region with a value of 0. That is, the zero-out can be applied to a region that is not changed due to the LFNST and maintains the result of the forward primary transformation. As described above, since the LFNST is divided into the 4×4 LFNST and the 8×8 LFNST, the zero-out can be divided into two types ((ii)-(A) and (ii)-(B)) as follows.

Figure 13:
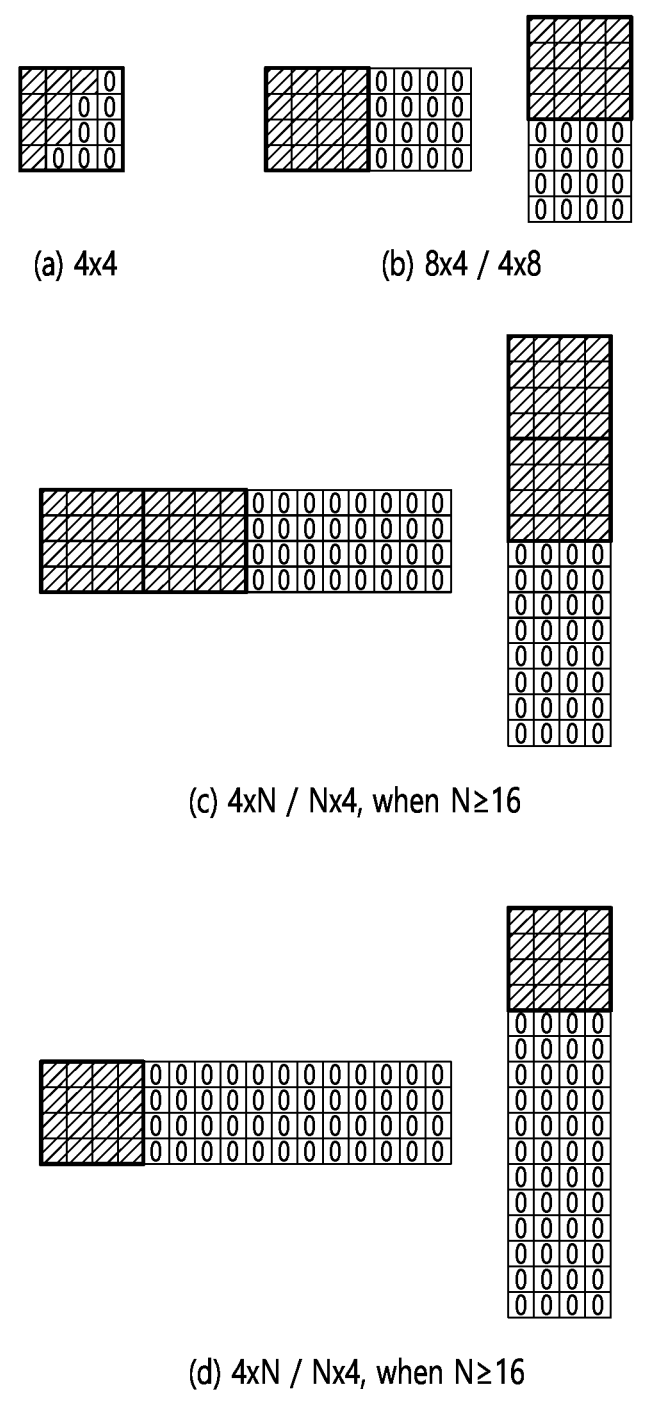

(ii)-(A) When the 4×4 LFNST is applied, a region to which the 4×4 LFNST is not applied may be zeroed out. FIG. 13 is a diagram illustrating the zero-out in a block to which the 4×4 LFNST is applied according to an example.

As shown in FIG. 13, with respect to a block to which the 4×4 LFNST is applied, that is, for all of the blocks in (a), (b) and (c) of FIG. 12, the whole region to which the LFNST is not applied may be filled with zeros.

On the other hand, (d) of FIG. 13 shows that when the maximum value of the number of the output data of the forward LFNST is limited to 16 according to an example, the zero-out is performed on the remaining blocks to which the 4×4 LFNST is not applied.

Figure 14:
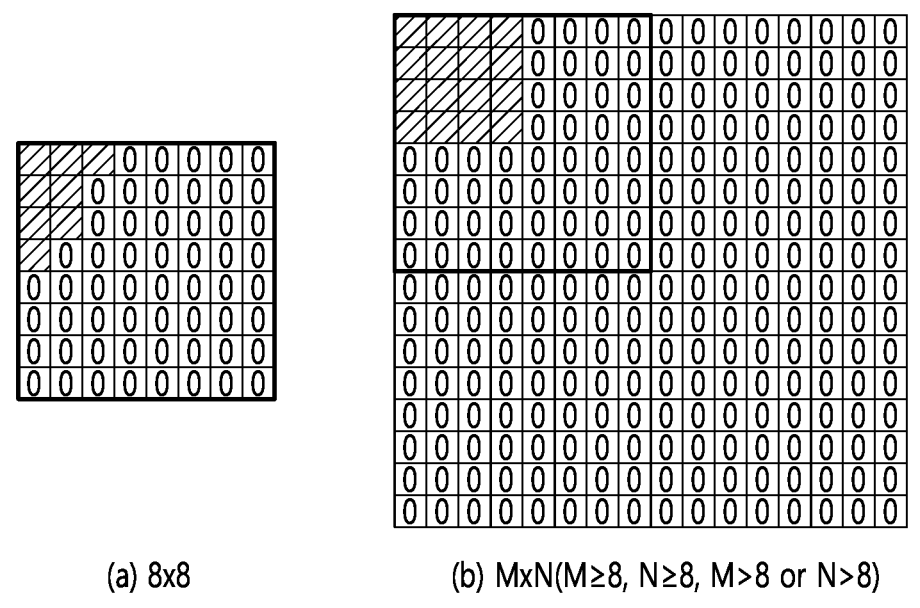

(ii)-(B) When the 8×8 LFNST is applied, a region to which the 8×8 LFNST is not applied may be zeroed out. FIG. 14 is a diagram illustrating the zero-out in a block to which the 8×8 LFNST is applied according to an example.

As shown in FIG. 14, with respect to a block to which the 8×8 LFNST is applied, that is, for all of the blocks in (d) and (e) of FIG. 12, the whole region to which the LFNST is not applied may be filled with zeros.

(iii) Due to the zero-out presented in (ii) above, the area filled with zeros may be not same when the LFNST is applied. Accordingly, it is possible to check whether the non-zero data exists according to the zero-out proposed in (ii) over a wider area than the case of the LFNST of FIG. 12.

For example, when (ii)-(B) is applied, after checking whether the non-zero data exists where the area filled with zero values in (d) and (e) of FIG. 12 in addition to the area filled with 0 additionally in FIG. 14, signaling for the LFNST index can be performed only when the non-zero data does not exist.

Of course, even if the zero-out proposed in (ii) is applied, it is possible to check whether the non-zero data exists in the same way as the existing LFNST index signaling. That is, after checking whether the non-zero data exists in the block filled with zeros in FIG. 12, the LFNST index signaling may be applied. In this case, the encoding apparatus only performs the zero out and the decoding apparatus does not assume the zero out, that is, checking only whether the non-zero data exists only in the area explicitly marked as 0 in FIG. 12, may perform the LFNST index parsing.

Various embodiments in which combinations of the simplification methods ((i), (ii)-(A), (ii)-(B), (iii)) for the LFNST are applied may be derived. Of course, the combinations of the above simplification methods are not limited to the following an embodiment, and any combination may be applied to the LFNST.

Embodiment

Limit the number of output data for forward LFNST to a maximum of 16 (i)

When the 4×4 LFNST is applied, all areas to which the 4×4 LFNST is not applied are zero-out (ii)-(A)

When the 8×8 LFNST is applied, all areas to which the 8×8 LFNST is not applied are zero-out (ii)-(B)

After checking whether the non-zero data exists also the existing area filled with zero value and the area filled with zeros due to additional zero outs ((ii)-(A), (ii)-(B)), the LFNST index is signaled only when the non-zero data does not exist→(iii)

In the case of the Embodiment, when the LFNST is applied, an area in which the non-zero output data can exist is limited to the inside of the top-left 4×4 area. In more detail, in the case of (a) of FIG. 13 and (a) of FIG. 14, the 8th position in the scan order is the last position where non-zero data can exist. In the case of (b) and (c) of FIG. 13 and (b) of FIG. 14, the 16th position in the scan order (i.e., the position of the bottom-right edge of the top-left 4×4 block) is the last position where data other than 0 may exist.

Therefore, when the LFNST is applied, after checking whether the non-zero data exists in a position where the residual coding process is not allowed (at a position beyond the last position), it can be determined whether the LFNST index is signaled.

In the case of the zero-out method proposed in (ii), since the number of data finally generated when both the primary transform and the LFNST are applied, the amount of computation required to perform the entire transformation process can be reduced. That is, when the LFNST is applied, since zero-out is applied to the forward primary transform output data existing in a region to which the LFNST is not applied, there is no need to generate data for the region that become zero-out during performing the forward primary transform. Accordingly, it is possible to reduce the amount of computation required to generate the corresponding data. The additional effects of the zero-out method proposed in (ii) are summarized as follows.

First, as described above, the amount of computation required to perform the entire transform process is reduced.

In particular, when (ii)-(B) is applied, the amount of calculation for the worst case is reduced, so that the transform process can be lightened. In other words, in general, a large amount of computation is required to perform a large-size primary transformation. By applying (ii)-(B), the number of data derived as a result of performing the forward LFNST can be reduced to 16 or less. In addition, as the size of the entire block (TU or CU) increases, the effect of reducing the amount of transform operation is further increased.

Second, the amount of computation required for the entire transform process can be reduced, thereby reducing the power consumption required to perform the transform.

Third, the latency involved in the transform process is reduced.

The secondary transformation such as the LFNST adds a computational amount to the existing primary transformation, thus increasing the overall delay time involved in performing the transformation. In particular, in the case of intra prediction, since reconstructed data of neighboring blocks is used in the prediction process, during encoding, an increase in latency due to a secondary transformation leads to an increase in latency until reconstruction. This can lead to an increase in overall latency of intra prediction encoding.

However, if the zero-out suggested in (ii) is applied, the delay time of performing the primary transform can be greatly reduced when LFNST is applied, the delay time for the entire transform is maintained or reduced, so that the encoding apparatus can be implemented more simply.

In the conventional intra prediction, a block to be currently encoded is regarded as one encoding unit and encoding was performed without splitting. However, intra sub-partitions (ISP) coding means performing intra prediction encoding by dividing a block to be currently encoded in a horizontal direction or a vertical direction. In this case, a reconstructed block may be generated by performing encoding/decoding in units of divided blocks, and the reconstructed block may be used as a reference block of the next divided block. According to an embodiment, in ISP coding, one coding block may be divided into two or four sub-blocks and coded, and in ISP, in one sub-block, intra prediction is performed with reference to a reconstructed pixel value of a sub-block located at the adjacent left side or adjacent upper side. Hereinafter, "coding" may be used as a concept including both coding performed by an encoding apparatus and decoding performed by a decoding apparatus.

ISP is to partition a luma intra-predicted block into 2 or 4 subpartitionings in a vertical or horizontal length based on the size of the block. For example, a minimum block size to which ISP may be applied is 4×8 or 8×4. If the block size is greater than 4×8 or 8×4, the block is partitioned into 4 subpartitionings.

Upon ISP application, subblocks may be sequentially coded, for example, horizontally or vertically, from the left to the right or from the top to the bottom depending on a partition form. After coding is performed on one subblock up to a reconstruction process through a reverse transform and intra prediction, the coding may be performed on a next subblock. The leftmost or highest subblock refers to a reconstruction pixel of an already coded coding block as in a common intra prediction method. Furthermore, if a previous subblock does not neighbor each side of a subsequent internal subblock, in order to derive reference pixels neighboring the corresponding side, reference is made to a reconstruction pixel of an already coded neighbor coding block as in a common intra prediction method.

In the ISP coding mode, all subblocks may be coded in the same intra prediction mode. A flag indicating whether to use ISP coding and a flag indicating that a subblock will be partitioned in which direction (horizontal or vertical) may be signaled. In this case, the number of subblocks may be adjusted to 2 or 4 depending on a block shape. If the size (width×height) of one subblock is less than 16, partition into the corresponding subblock is not permitted, or may be limited so that ISP coding itself is not applied.

Meanwhile, in the case of the ISP prediction mode, one coding unit is partitioned and predicted as 2 or 4 partition blocks, that is, subblocks, and the same intra prediction mode is applied to the corresponding partitioned 2 or 4 partition blocks.

As described above, a partition direction may include both a horizontal length (if an M×N coding unit in which a horizontal length and a vertical length are M and N, respectively, is partitioned in a horizontal length, the M×N coding unit is partitioned into M×(N/2) blocks if it is partitioned into 2, and is partitioned into M×(N/4) blocks if it is partitioned into 4) and a vertical direction (if an M×N coding unit is partitioned in a vertical direction, the M×N coding unit is partitioned into (M/2)×N blocks if it is partitioned into 2, and is partitioned into (M/4)×N blocks if it is partitioned into 4). If partition blocks are partitioned in the horizontal length, the partition blocks are coded in a direction order from the top to the bottom. If partition blocks are partitioned in the vertical length, the partition blocks are coded in a direction order from the left to the right. A partition block that is now coded may be predicted with reference to a reconstructed pixel value of a top (left) partition block in the case of horizontal (vertical) partition.

A transform may be applied to a residual signal generated using the ISP prediction method in a partition block unit. A DST-7/DCT-8 combination-based multiple transform selection (MTS) technology in addition to the existing DCT-2 may be applied to a core transform or a primary transform on the basis of a forward direction. A forward low frequency non-separable transform (LFNST) may be applied to transform coefficients generated according to the core transform, so that the finally modified transform coefficients may be generated.

That is, the LFNST may also be applied to partition blocks partitioned by applying the ISP prediction mode. The same intra prediction mode is applied to the partition blocks partitioned as described above. Accordingly, when an LFNST set derived based on the intra prediction mode is selected, the derived LFNST set may be applied to all the partition blocks. That is, since the same intra prediction mode is applied to all the partition blocks, the same LFNST set may be applied to all the partition blocks.

Meanwhile, according to an example, the LFNST may be applied to only a transform block in which both horizontal and vertical lengths are 4 or more. Accordingly, if the horizontal or vertical length of a partition block partitioned using the ISP prediction method is less than 4, the LFNST is not applied, and the LFNST index is also not signaled. Furthermore, if the LFNST is applied to each partition block, the corresponding partition block may be considered as one transform block. If the ISP prediction method is not applied, the LFNST may be applied to the coding block.

To apply the LFNST to each partition block is described in detail as follows.

According to an example, if a forward LFNST is applied to an individual partition block, after only a maximum of 16 (8 or 16) coefficients are left in a top left 4×4 region according to a transform coefficient scanning order, zero-out in which all the remaining positions and regions are filled with a value 0 may be applied.

Or, according to an example, if the length of one side of a partition block is 4, the LFNST may be applied to only a top left 4×4 region. If the length of all sides, that is, the width and height of a partition block, is 8 or more, the LFNST may be applied to the remaining 48 coefficients except a bottom right 4×4 region within the top left 8×8 region.

Or, according to an example, in order to match computational complexity in the worst case with 8 multiplications/samples (multiplications per sample), if each partition block is 4×4 or 8×8, only 8 transform coefficients may be outputted after the application of a forward LFNST. That is, if a partition block is 4×4, an 8×16 matrix may be applied as a transform matrix. If a partition block is 8×8, an 8×48 matrix may be applied as a transform matrix.

Meanwhile, in the current VVC standard, the signaling of an LFNST index is performed in a coding unit unit. Accordingly, if a mode is the ISP prediction mode and the LFNST is applied to all partition blocks, a value of the same LFNST index may be applied to the corresponding partition blocks. That is, if a value of an LFNST index is transmitted once in a coding unit level, the corresponding LFNST index may be applied to all partition blocks within the coding unit. As described above, a value of an LFNST index may have a value 0, 1, or 2.0 indicates a case where the LFNST is not applied, and 1 and 2 indicate two transform matrices present within one LFNST set when the LFNST is applied.

As described above, an LFNST set is determined by the intra prediction mode. In the case of the ISP prediction mode, all partition blocks within a coding unit is predicted as the same intra prediction mode. Accordingly, the partition blocks may refer to the same LFNST set.

As another example, the signaling of an LFNST index is still performed in a coding unit unit. However, in the case of the ISP prediction mode, whether to apply the LFNST to all partition blocks is not uniformly determined, but whether to apply a value of an LFNST index signaled in a coding unit level to each of partition blocks or whether the LFNST will not be applied may be determined based on a separate condition. In this case, the separate condition may be signaled in a flag form for each partition block through a bitstream. A value of an LFNST index signaled in a coding unit level may be applied when a value of the flag is 1, and the LFNST may not be applied when a value of the flag is 0.

Hereinafter, a method of maintaining computational complexity in the worst case when the LFNST is applied to the ISP mode is described.

In the case of the ISP mode, when the LFNST is applied, the application of the LFNST may be limited in order to maintain a multiplication number per sample (or per coefficient or per position) to a given value or less. A multiplication number per sample (or per coefficient or per position) may be maintained to 8 or less by applying the LFNST as follows based on the size of a partition block.

1. When both the horizontal and vertical lengths of a partition block are 4 or more, the same method as a computational complexity adjustment method may be applied to the worst case for the LFNST in the current VVC standard.

That is, when a partition block is a 4×4 block, an 8×16 matrix obtained by sampling upper 8 rows from a 16×16 matrix may be applied in a forward direction instead of the 16×16 matrix. A 16×8 matrix obtaining by sampling left 8 columns from a 16×16 matrix may be applied in a backward direction. Furthermore, when a partition block is an 8×8 block, an 8×48 matrix obtained by sampling upper 8 rows from a 16×48 matrix may be applied in a forward direction instead of the 16×48 matrix. A 48×8 matrix obtained by sampling left 8 columns from a 48×16 matrix may be applied instead of the 48×16 matrix in a backward direction.

In the case of a 4×N or N×4 (N>4) block, when a forward transform is performed, 16 coefficients generated after a 16×16 matrix is applied to only a top left 4×4 block may be disposed in a top left 4×4 region, and other regions may be filled with a value 0. Furthermore, when a backward transform is performed, after an input vector is configured by disposing 16 coefficients in a top left 4×4 block in a scanning order thereof, 16 output data may be generated by multiplying the input vector by a next 16×16 matrix. The generated output data may be disposed in the top left 4×4 region, and the remaining region except the top left 4×4 region may be filled with 0.

In the case of an 8×N or N×8 (N>8) block, when a forward transform is performed, 16 coefficients generated after a 16×48 matrix is applied to only an ROI region (the remaining region except a bottom right 4×4 block in a top left 8×8 block) within a top left 8×8 block may be disposed in a top left 4×4 region, and all of other regions may be filled with a value 0. Furthermore, when a backward transform is performed, an input vector may be configured by disposing 16 coefficients in a top left 4×4 block in a scanning order thereof, and 48 output data may be generated by multiplying the input vector by a next 48×16 matrix. The generated output data may be filled with an ROI region, and all the remaining regions may be filled with a value 0.

As another example, in order to maintain a multiplication number per sample (or per coefficient or per position) as a given value or less, a multiplication number per sample (or per coefficient or per position) may be maintained to 8 or less on the basis of the size of an ISP coding unit not the size of an ISP partition block. If there is any one block that satisfies a condition in which the LFNST is applied among ISP partition block, a complexity operation for the LFNST worst case may be applied on the basis of the size of a corresponding coding unit not the size of a partition block. For example, if a luma coding block for any coding unit is partitioned as 4 partition blocks having a 4×4 size and coded as ISP and a non-zero transform coefficient is not present with respect to two of the partition blocks, 16 transform coefficients not 8 transform coefficients may be configured to be generated in other two partition blocks (on the basis of the encoder).

Hereinafter, a method of signaling an LFNST index in the case of the ISP mode is described.

As described above, an LFNST index may have a value 0, 1, or 2.0 indicates that an LFNST is not applied, and 1 and 2 indicate two LFNST kernel matrices included in a selected LFNST set, respectively. The LFNST is applied based on an LFNST kernel matrix selected by the LFNST index. In the current VVC standard, a method of transmitting an LFNST index is described as follows.

1. An LFNST index may be transmitted once every coding unit (CU). In the case of the dual tree, individual LFNST indices may be signaled with respect to a luma block and a chroma block.

2. If an LFNST index is not signaled, a value of the LFNST index is inferred as 0, that is, a default value. A case where a value of the LFNST index is inferred as 0 is as follows.

A. In the case of a mode to which a transform is not applied (e.g., a transform skip, BDPCM, lossless coding, etc.)

B. If a core transform is not DCT-2 (DST7 or DCT8), that is, if a horizontal transform or a vertical transform is not DCT-2

C. If the horizontal length or vertical length of a luma block of a coding unit exceeds a maximum size of a luma transform capable of a transform, for example, if the size of a luma block of a coding block is 128×16 when a maximum size of a luma transform capable of a transform is 64, an LFNST cannot be applied.

In the case of the dual tree, whether a maximum size of a luma transform is exceeded with respect to each of a coding unit for a luma component and a coding unit for a chroma component is determined. That is, whether a maximum size of a luma transform capable of a transform is exceeded is checked with respect to a luma block. Whether the horizontal/vertical length of a corresponding luma block and a maximum size of a luma transform capable of a maximum transform for a color format are exceed is checked with respect to a chroma block. For example, if a color format is 4:2:0, the horizontal/vertical length of a corresponding luma block becomes twice each corresponding chroma block, and a transform size of a corresponding luma block becomes twice the corresponding chroma block. Furthermore, for example, if a color format is 4:4:4, the horizontal/vertical length and transform size of a corresponding luma block is identical with that of a corresponding chroma block.

A 64-length transform or a 32-length transform may mean a transform applied to a horizontal or vertical having a 64 or 32 length. A "transform size" may mean 64 or 32, that is, a corresponding length.

In the case of the single tree, after whether a horizontal length or a vertical length of a luma block exceeds a maximum size of a luma transform block capable of a transform is checked, the signaling of an LFNST index may be omitted when the horizontal length or vertical length exceeds the maximum size.

D. An LFNST index may be transmitted only when both the horizontal length and vertical length of a coding unit are 4 or more.

In the case of the dual tree, an LFNST index may be signaled only when both the horizontal length and vertical length of a corresponding component (i.e., a luma or chroma component) are 4 or more.

In the case of the single tree, an LFNST index may be signaled only when both the horizontal length and vertical length of a luma component are 4 or more.

E. If the last non-zero coefficient position is not a DC position (top left position of a block), an LFNST index is transmitted in the case of the dual tree type of a luma block. In the case of a chroma block of the dual tree type, a corresponding LNFST index is transmitted if any one of the last non-zero coefficient position for Cb and the last non-zero coefficient position for Cr is not a DC position.

In the case of the single tree type, if the last non-zero coefficient position for any one of a luma component, a Cb component, and a Cr component is not a DC position, an LFNST index is transmitted.

In this case, when a value of a coded block flag (CBF) indicating whether a transform coefficient for one transform block is present is 0, in order to indicate whether an LFNST index will be signaled, the last non-zero coefficient position for the corresponding transform block is not checked. That is, when a value of a corresponding CBF is 0, a transform is not applied to a corresponding block. Accordingly, the last non-zero coefficient position may not be considered when a condition for the signaling of an LFNST index is checked.

For example, 1) when a value of a corresponding CBF is 0 in the case of the dual tree type and a luma component, an LFNST index is not signaled. 2) In the case of the dual tree type and a chroma component, when a value of a CBF for Cb is 0 and a value of a CBF for Cr is 1, only the last non-zero coefficient position for Cr is checked, and a corresponding LFNST index is transmitted. 3) In the case of the single tree type, the last non-zero coefficient position is checked with respect to only components each having CBF value of 1 with respect to all of a luma, Cb, and Cr.

F. If it is checked that a transform coefficient is present at a position not a position where an LFNST transform coefficient may be present, the signaling of an LFNST index may be omitted. In the case of a 4×4 transform block and an 8×8 transform block, an LFNST transform coefficient may be present from a DC position to 8 positions according to a transform coefficient scanning order in the VVC standard, and all the remaining positions are filled with 0. Furthermore, if a block is not a 4×4 transform block and an 8×8 transform block, an LFNST transform coefficient may be present from a DC position to 16 positions in a transform coefficient scanning order in the VVC standard, and all the remaining positions are filled with 0.

Accordingly, after residual coding is performed, when a non-zero transform coefficient is present in a region with which a value 0 needs to be filled, the signaling of an LFNST index may be omitted.

Meanwhile, the ISP mode may be applied to only a luma block or may be applied to both a luma block and a chroma block. As described above, if ISP prediction is applied, a corresponding coding unit may be partitioned into 2 or 4 partition blocks and predicted, and a transform may also be applied to each of the corresponding partition blocks. Accordingly, when a condition for signaling an LFNST index in a coding unit unit is determined, the fact that an LFNST may be applied to each of corresponding partition blocks needs to be considered. Furthermore, if an ISP prediction mode is applied to only a specific component (e.g., a luma block), an LFNST index needs to be signaled by considering that only the corresponding component is partitioned into partition blocks. Methods of signaling an LFNST index in the case of the ISP mode are listed as follows.

1. An LFNST index may be transmitted once every coding unit (CU). In the case of the dual tree, an individual LFNST index may be signaled with respect to each of a luma block and a chroma block.
2. If an LFNST index is not signaled, a value of the LFNST index is inferred as 0, that is, a default value. A case where a value of the LFNST index is inferred as 0 is as follows.
   A. In the case of a mode to which a transform is not applied (e.g., a transform skip, BDPCM, lossless coding, etc.)
   B. If the horizontal length or vertical length of a luma block of a coding unit exceeds a maximum size of a luma transform capable of a transform, for example, when a maximum size of a luma transform capable of a transform is 64, an LFNST cannot be applied if the size of a luma block of a coding block is 128×16.

Whether to signal an LFNST index may be determined on the basis of the size of a partition block instead of a coding unit. That is, if the horizontal length or vertical length of a partition block of a corresponding luma block exceeds a maximum size of a luma transform capable of a transform, the signaling of an LFNST index may be omitted, and a value of the LFNST index may be inferred as 0.

In the case of the dual tree, whether a maximum size of a transform block is exceeded with respect to each of a coding unit or a partition block for a luma component and a coding unit or a partition block for a chroma component is determined. That is, each of the horizontal and vertical lengths of the coding unit or partition block for the luma is compared with a maximum size of a luma transform. If any one of the horizontal and vertical lengths is greater than the maximum size of a luma transform, an LFNST is not applied. In the case of the coding unit or the partition block for the chroma, the horizontal/vertical length of a corresponding luma block for a color format is compared with a maximum size of a luma transform capable of a maximum transform. For example, if a color format is 4:2:0, the horizontal/vertical length of a corresponding luma block becomes twice a corresponding chroma block, and the transform size of a corresponding luma block becomes twice a corresponding chroma block. Furthermore, for example, if a color format is 4:4:4, the horizontal/vertical length and transform size of a corresponding luma block is identical with a corresponding chroma block.

In the case of the single tree, whether the horizontal length or vertical length of a luma block (coding unit or partition block) exceeds a maximum size of a luma transform block capable of a transform is checked. If the horizontal length or the vertical length exceeds the maximum size, the signaling of an LFNST index may be omitted.

C. If an LFNST included in the current VVC standard is applied, an LFNST index may be transmitted only when both the horizontal length and vertical length of a partition block are 4 or more.

If up to an LFNST for a 2×M (1×M) or M×2 (M×1) block in addition to an LFNST included in the current VVC standard is applied, an LFNST index may be transmitted only when the size of a partition block is equal to or greater than a 2×M (1×M) or M×2 (M×1) block. In this case, when a P×Q block is equal to or greater than an R×S block, this means P≥R and Q≥S.

That is, an LFNST index may be transmitted only when a partition block is equal to or greater than a minimum size to which an LFNST may be applied. In the case of the dual tree, an LFNST index may be signaled only when a partition block for a luma or chroma component is equal to or greater than a minimum size to which an LFNST may be applied. In the case of the single tree, an LFNST index may be signaled only when a partition block for a luma component is equal to or greater than a minimum size to which an LFNST may be applied.

In this document, when a K×N block is greater than or equal to a K×L block, this means that M is greater than or equal to K and N is greater than or equal to L. When the K×N block is greater than the K×L block, this means M is greater than or equal to K, N is greater than or equal to L, M is greater than K, and N is greater than L. When the K×N block is smaller than or equal to the K×L block, this means that M is smaller than or equal to K and N is smaller than or equal to L. When the K×N block is smaller than the K×L block, this means that M is smaller than or equal to K, N is smaller than or equal to L, M is smaller than K, and N is smaller than L.

D. If the last non-zero coefficient position is not a DC position (top left position of a block), an LFNST index may be transmitted if the last non-zero coefficient position of any one of all partition blocks is not a DC position in the case of the dual tree type of a luma block. In the case of the dual tree type and a chroma block, if any one of the last non-zero coefficient position of all partition blocks for Cb (if the ISP mode is not applied to a chroma component, the number of partition blocks is considered to be one) and the last non-zero coefficient position of all partition blocks for Cr (if the ISP mode is not applied to a chroma component, the number of partition blocks is considered to be one) is not a DC position, a corresponding LNFST index may be transmitted.

In the case of the single tree type, a corresponding LFNST index may be transmitted if the last non-zero coefficient position of any one of all partition blocks for a luma component, a Cb component, and a Cr component is not a DC position.

In this case, when a value of a coded block flag (CBF) indicating whether a transform coefficient for each partition block is present is 0, the last non-zero coefficient position for the corresponding partition block is not checked in order to determine whether to signal an LFNST index. That is, when a value of the CBF is 0, the last non-zero coefficient position for a corresponding partition block is not considered when a condition for the signaling of an LFNST index is checked because a transform is not applied to the corresponding block.

For example, 1) in the case of the dual tree type and a luma component, a value of a corresponding CBF for each partition block is 0, the corresponding partition block is excluded whether to signal an LFNST index is determined, 2) in the case of the dual tree type and a chroma component, when a value of a CBF for Cb is 0 and a value of a CBF for Cr is 1 with respect to each partition block, whether to signal a corresponding LFNST index is determined by checking only the last non-zero coefficient position for Cr, and 3) in the case of the single tree type, whether to signal an LFNST index may be determined by checking the last non-zero coefficient position of each of blocks whose value of a CBF is 1 among all partition blocks for a luma component, a Cb component, and a Cr component.

In the case of the ISP mode, image information may be configured so that the last non-zero coefficient position is not checked, and an embodiment thereof is as follows.

i. In the case of the ISP mode, a check for the last non-zero coefficient position may be omitted with respect to both a luma block and a chroma block, and the signaling of an LFNST index may be permitted. That is, although the last non-zero coefficient position is a DC position or a value of a corresponding CBF is 0 with respect to all partition blocks, corresponding the signaling of an LFNST index may be permitted.

ii. In the case of the ISP mode, a check for the last non-zero coefficient position may be omitted with respect to only a luma block. A check for the last non-zero coefficient position using the aforementioned method may be performed with respect to a chroma block. For example, in the case of the dual tree type and a luma block, the last non-zero coefficient position is not checked, and the signaling of an LFNST index is permitted. In the case of the dual tree type and a chroma block, whether to signal an LFNST index may be determined by checking whether a DC position for the last non-zero coefficient position is present by using the aforementioned method.

iii. In the case of the ISP mode and the single tree type, the No. i or the No. ii method may be applied. That is, if the No. i is applied to the ISP mode and the single tree type, a check for the last non-zero coefficient position may be omitted with respect to both a luma block and a chroma block, and the signaling of an LFNST index may be permitted. Or, the No. ii may be applied, and whether to signal a corresponding LFNST index may be determined by omitting a check for the last non-zero coefficient position with respect to a partition block for a luma component and performing the last non-zero coefficient position using the aforementioned method with respect to partition blocks for a chroma component (if ISP is not applied to a chroma component, the number of partition blocks may be considered to be 1).

E. if it is checked that a transform coefficient is present in a position not a position where an LFNST transform coefficient may be present with respect to one of all partition blocks, the signaling of an LFNST index may be omitted.

For example, in the case of a 4×4 partition block and an 8×8 partition block, an LFNST transform coefficient may be present from a DC position to 8 positions in a transform coefficient scanning order in the VVC standard, and all the remaining positions are filled with 0. Furthermore, if a block is equal to or greater than 4×4 and is not a 4×4 partition block and an 8×8 partition block, an LFNST transform coefficient may be present from a DC position to 16 positions in a transform coefficient scanning order in the VVC standard, and all the remaining positions are filled with 0.

Accordingly, after residual coding is performed, if a non-zero transform coefficient is present in a region with which a value 0 needs to be filled, the signaling of an LFNST index may be omitted.

Meanwhile, in the case of the ISP mode, in the current VVC standard, DST-7 is independently applied to each of a horizontal length and a vertical direction instead of DCT-2 without the signaling of an MTS index based on a length condition. Whether the horizontal or the vertical length is equal to or greater than 4 and is equal or smaller than 16 is determined, and a core transform kernel is determined based on a result of the determination. Accordingly, if a mode is the ISP mode and an LFNST is applied, the following transform combination configuration is possible.

1. If an LFNST index is 0 (including a case where an LFNST index is inferred as 0), a core transform determination condition in the case of ISP included in the current VVC standard may be followed. That is, whether a length condition (a condition in which the length is equal to or greater than 4 and is equal or smaller than 16) satisfies the horizontal length and the vertical direction is independently checked. DST-7 may be applied for a core transform instead of DCT-2 if the length condition is satisfied, and DCT-2 may be applied if the length condition is not satisfied.
2. If an LFNST index is greater than 0, the following two configurations may be possible as a core transform.
   A. DCT-2 may be applied to both a horizontal length and a vertical direction.
   B. A core transform determination condition in the case of ISP included in the current VVC standard may be followed. That is, whether a length condition (a condition in which the length is equal to or greater than 4 and is equal or smaller than 16) is satisfied is independently checked with respect to the horizontal length and the vertical direction. DST-7 may be applied instead of DCT-2 if the length condition is satisfied, and DCT-2 may be applied if the length condition is not satisfied.

In the case of the ISP mode, image information may be configured so that an LFNST index is not transmitted every coding unit and is transmitted every partition block. In such a case, in the aforementioned LFNST index signaling method, whether to signal an LFNST index may be determined by considering that only one partition block is present within a unit in which an LFNST index is transmitted.

Meanwhile, hereinafter, a signaling order of an LFNST index and an MTS index is described.

According to an example, in residual coding, a signaled LFNST index may be coded after a coding position for the last non-zero coefficient position. An MTS index may be coded right after the LFNST index. In the case of such a configuration, the LFNST index may be signaled every transform unit. Or, in residual coding, although not signaled, an LFNST index may be coded after the coding of the last valid coefficient position, and an MTS index may be coded after an LFNST index.

Syntax for residual coding according to an example is as follows.

TABLE 4

```
residual_coding(x0, y0, log2TbWidth, log2TbHeight, cIdx) {
    if((sps_mts_enabled_flag && cu_sbt_flag && log2TbWidth < 6 && log2TbHeight < 6)
            && cIdx = = 0 && log2TbWidth > 4)
        log2ZoTbWidth = 4
    else
        log2ZoTbWidth = Min(log2TbWidth, 5)
    MaxCcbs = 2 * (1 <<log2TbWidth) * (1<<log2TbHeight)
    if((sps_mts_enabled_flag && cu_sbt_flag && log2TbWidth < 6 && log2TbHeight < 6)
            && cIdx = = 0 && log2TbHeight > 4)
        log2ZoTbHeight = 4
    else
        log2ZoTbHeight = Min(log2TbHeight, 5)
    if(log2TbWidth > 0)
        last_sig_coeff_x_prefix
    if(log2TbHeight > 0)
        last_sig_coeff_y_prefix
    if(last_sig_coeff_x_prefix > 3)
        last_sig_coeff_x_suffix
    if(last_sig_coeff_y_prefix > 3)
        last_sig_coeff_y_suffix
    remBinsPass1 = ((1 << (log2TbWidth + log2TbHeight)) * 7) >> 2
    log2SbW = (Min(log2TbWidth, log2TbHeight) < 2 ? 1 : 2)
    log2SbH = log2SbW
    if(log2TbWidth + log2TbHeight > 3) {
        if(log2TbWidth < 2) {
            log2SbW = log2TbWidth
            log2SbH = 4 - log2SbW
        } else if(log2TbHeight < 2) {
            log2SbH = log2TbHeight
            log2SbW = 4 - log2SbH
        }
    }
    numSbCoeff = 1 << (log2SbW + log2SbH)
    lastScanPos = numSbCoeff
    lastSubBlock = (1 << (log2TbWidth + log2TbHeight - (log2SbW + log2SbH))) - 1
    do {
        if(lastScanPos = = 0) {
            lastScanPos = numSbCoeff
            lastSubBlock- -
        }
        lastScanPos- -
```

TABLE 4-continued

```
    xS = DiagScanOrder[ log2TbWidth - log2SbW ][ log2TbHeight - log2SbH ]
            [ lastSubBlock ][ 0 ]
    yS = DiagScanOrder[ log2TbWidth - log2SbW ][ log2TbHeight - log2SbH ]
            [ lastSubBlock ][ 1 ]
    xC = (xS << log2SbW) + DiagScanOrder[ log2SbW ][ log2SbH ][ lastScanPos ][ 0 ]
    yC = (yS << log2SbH) + DiagScanOrder[ log2SbW ][ log2SbH ][ lastScanPos ][ 1 ]
} while((xC != LastSignificantCoeffX) | | (yC != LastSignificantCoeffY))
    cbWidth = CbWidth[ 0 ][ x0 ][ y0 ]
    cbHeight = CbHeight[ 0 ][ x0 ][ y0 ]
if(Min(log2TbWidth, log2TbHeight) >= 2 && sps_lfnst_enabled_flag = = 1 &&
    CuPredMode[ chType ][ x0 ][ y0 ] = = MODE_INTRA &&
    IntraSubPartitionsSplit[ x0 ][ y0 ] = = ISP_NO_SPLIT &&
    (!intra_mip_flag[ x0 ][ y0 ] | | Min(log2TbWidth, log2TbHeight) >= 4) &&
    Max(cbWidth, cbHeight) <= MaxTbSizeY &&
        (cIdx = = 0 | | (treeType = = DUAL_TREE_CHROMA &&
        (cIdx = = 1 | | tu_cbf_cb[ x0 ][ y0 ] == 0)))) {
    if(lastSubBlock = = 0 && lastScanPos > 0 &&
            !(lastScanPos > 7 && (log2TbWidth = = 2 | | log2TbWidth = = 3)
            && log2TbWidth = = log2TbHeight))
        lfnst_idx[ x0 ][ y0 ]
}
if(cIdx = = 0 && lfnst_idx[ x0 ][ y0 ] = = 0 &&
    (log2TbWidth <= 5) && (log2TbHeight <= 5) &&
    (LastSignificantCoeffX < 16) && (LastSignificantCoeffY < 16) &&
    (IntraSubPartitionsSplit[ x0 ][ y0 ] = = ISP_NO_SPLIT) && (!cu_sbt_flag)) {
    if(((CuPredMode[ chType ][ x0 ][ y0 ] = = MODE_INTER &&
        sps_explicit_mts_inter_enabled_flag)
        | | (CuPredMode[ chType ][ x0 ][ y0 ] = = MODE_INTRA &&
        sps_explicit_mts_intra_enabled_flag)))
        tu_mts_idx[ x0 ][ y0 ]
}
if(tu_mts_idx[ x0 ][ y0 ] > 0 && cIdx = = 0 && log2TbWidth > 4)
    log2ZoTbWidth = 4
if(tu_mts_idx[ x0 ][ y0 ] > 0 && cIdx = = 0 && log2TbHeight > 4)
    log2ZoTbHeight = 4
log2TbWidth = log2ZoTbWidth
log2TbHeight = log2ZoTbHeight
    ...
```

The meanings of the main variables in the table 4 are as follows.

1. cbWidth, cbHeight: width and height of the current coding block
2. log 2TbWidth, log 2TbHeight: The log value of base-2 for the width and height of the current transform block and zero-out are reflected to be reduced to the upper left area where non-zero coefficients may exist.
3. sps_lfnst_enabled_flag: It is a flag indicating whether the LFNST is enable, if the flag value is 0, it indicates that the LFNST is not enable, and if the flag value is 1, it indicates that the LFNST is enable. It is defined in the Sequence Parameter Set (SPS).
4. CuPredMode[chType][x0][y0]: The prediction mode corresponding to the variable chType and the (x0, y0) position, chType may have values 0 and 1, where 0 represents the luma component and 1 represents the chroma component. (x0, y0) position indicates a position on a picture, and MODE_INTRA (intra prediction) and MODE_INTER (inter prediction) are possible with CuPredMode[chType] [x0] [y0] values.
5. IntraSubPartitionsSplit[x0][y0]: The contents of the (x0, y0) position are the same as in No. 4. It is indicated which ISP division at the (x0, y0) position is applied, and ISP_NO_SPLIT indicates that the coding unit corresponding to the (x0, y0) position is not divided into partition blocks.
6. intra_mip_flag[x0][y0]: The contents of the (x0, y0) position are the same as in No. 4 above. The intra_mip_flag is a flag indicating whether a matrix-based intra prediction (MIP) prediction mode is applied. The flag value of 0 indicates that MIP is not enable, and the flag value of 1 indicates that MIP is applied.
7. cIdx: A value of 0 indicates luma, and values of 1 and 2 indicate Cb and Cr, which are chroma components, respectively.
8. treeType: It indicates single-tree and dual-tree, etc. (SINGLE_TREE: single tree, DUAL_TREE_LUMA: dual tree for luma component, DUAL_TREE_CHROMA: dual tree for chroma component)
9. The contents of a tu_cbf_cb[x0][y0]: (x0, y0) position is the same as No. 4, and indicates a coded block flag (CBF) for a Cb component. When a corresponding value is 0, this means that a non-zero coefficient is not present in a corresponding transform unit for a Cb component. When a corresponding value is 1, this means that a non-zero coefficient is present in a corresponding transform unit for a Cb component.
10. lastSubBlock: It indicates a position in the scan order of a sub-block (Coefficient Group (CG)) in which the last non-zero coefficient is position. 0 indicates a sub-block including a DC component, and if greater than 0, it is not a sub-block including a DC component.
11. lastScanPos: It indicates where the last significant coefficient is in the scan order within one sub-block. If one sub-block consists of 16 positions, values from 0 to 15 are possible.
12. lfnst_idx[x0][y0]: LFNST index syntax element to be parsed. If it is not parsed, it is inferred as a value of 0. That is, the default value is set to 0 and indicates that LFNST is not applied.
13. LastSignificantCoeffX, LastSignificantCoeffY: It indicates the x-coordinate and y-coordinate where the last significant coefficient is located in the transform block. The x-coordinate starts at 0 and increases from left to right, and the y-coordinate starts at 0 and increases from top to bottom. If the values of both variables are 0, it means that the last significant coefficient is located at DC.

14. cu_sbt_flag: It is a flag indicating whether SubBlock Transform (SBT) included in the current VVC standard is enable. If the flag value is 0, it indicates that SBT is not enable and if the flag value is 1, it indicates that SBT is applied.

15. sps_explicit_mts_inter_enabled_flag, sps_explicit_mts_intra_enabled_flag: It is a flag indicating whether or not explicit MTS is applied to an inter CU and an intra CU, respectively. If the corresponding flag value is 0, it indicates that MTS is not applicable to the inter-CU or intra-CU, and if it is 1, it indicates that MTS is applicable.

16. tu_mts_idx[x0][y0]: It is MTS index syntax element to be parsed. If it is not parsed, it is inferred as a value of 0. That is, the default value is set to 0, it is indicated that DCT-2 is applied to both the horizontal and vertical directions.

As in Table 4, in the case of the single tree, whether to signal an LFNST index may be determined based on only the last valid coefficient position condition for a luma. That is, if the last valid coefficient position is not DC and the last valid coefficient is present in a top left subblock (CG), for example, within a 4×4 block, an LFNST index is signaled. In this case, in the case of a 4×4 transform block and an 8×8 transform block, an LFNST index is signaled only when the last valid coefficient is present at positions from 0 to 7 within the top left subblock.

In the case of the dual tree, an LFNST index may be independently signaled with respect to a luma and a chroma. In the case of the chroma, an LFNST index may be signaled by applying the last valid coefficient position condition to only a Cb component. A corresponding condition may not be checked with respect to a Cr component. If a value of a CBF for Cb is 0, an LFNST index may be signaled by applying the last valid coefficient position condition to a Cr component.

In Table 4, 'Min(log 2TbWidth, log 2TbHeight)>=2' may be represented as "Min(tbWidth, tbHeight)>=4", and 'Min (log 2TbWidth, log 2TbHeight)>=4' may be represented "Min(tbWidth, tbHeight)>=16."

In Table 4, each of log 2ZoTbWidth and log 2ZoTbHeight means a log value in which the base of each of the width and the height for a top left region in which the last valid coefficient may be present due to zero-out is 2 (base-2).

As in Table 4, the values log 2ZoTbWidth and log 2ZoTbHeight may be updated at two places. The first place is before a value of an MTS index or an LFNST index is parsed, and the second place is after an MTS index is parsed.

The first update is before a value of the MTS index (tu_mts_idx[x0][y0]) is parsed, and thus log 2ZoTbWidth and log 2ZoTbHeight may be set regardless of a value of the MTS index.

After the MTS index is parsed, log 2ZoTbWidth and log 2ZoTbHeight are set when a value of the MTS index is greater than 0 (in the case of a DST-7/DCT-8 combination). If DST-7/DCT-8 are independently applied to a horizontal length and a vertical direction in a core transform, up to a maximum of 16 valid coefficients may be present every row or column with respect to each direction. That is, after DST-7/DCT-8 having a 32 length or more is applied, a maximum of 16 transform coefficients may be derived every row or column from the left to the right. Accordingly, when DST-7/DCT-8 is applied to both a horizontal length and a vertical direction with respect to a two-dimensional block, a valid coefficient may be present up to a maximum top left 16×16 region.

Furthermore, in a current core transform, if DCT-2 is independently applied with respect to a horizontal length and a vertical direction, a maximum of 32 valid coefficients may be present every row or column with respect to each direction. That is, if DCT-2 having a 64 length or more is applied, a maximum of 32 transform coefficients may be derived every row or column from the left to the right. Accordingly, when DCT-2 is applied both the horizontal length and the vertical direction with respect to a two-dimensional block, a valid coefficient may be present up to only a maximum top left 32×32 region.

Furthermore, when DST-7/DCT-8 is applied on one side and DCT-2 is applied on the other side with respect to the horizontal length and the vertical direction, 16 valid coefficients may be present in the former direction, and 32 valid coefficients may be present in the latter direction. For example, if a block is a 64×8 transform block and DCT-2 is applied to the horizontal length and DST-7 is applied to the vertical direction (a situation in which implicit MTS is applied may occur), a valid coefficient may be present in a maximum top left 32×8 region.

If log 2ZoTbWidth and log 2ZoTbHeight are updated at two places as in Table 4, that is, if log 2ZoTbWidth and log 2ZoTbHeight are updated before an MTS index is parsed, as in the following table, the range of last_sig_coeff_x_prefix and last_sig_coeff_y_prefix may be determined by log 2ZoTbWidth and log 2ZoTbHeight.

TABLE 5

| 7.4.9.11 Residual coding semantics |
|---|
| ......<br>last_sig_coeff_x_prefix specifies the prefix of the column position of the last significant coefficient in scanning order within a transform block. The values of last_sig_coeff_x_prefix shall be in the range of 0 to (log2ZoTbWidth << 1) − 1, inclusive.<br>When last_sig_coeff_x_prefix is not present, it is inferred to be 0.<br>last_sig_coeff_y_prefix specifies the prefix of the row position of the last significant coefficient in scanning order within a transform block. The values of last_sig_coeff_y_prefix shall be in the range of 0 to (log2ZoTbHeight << 1) − 1, inclusive.<br>When last_sig_coeff_y_prefix is not present, it is inferred to be 0. |

Furthermore, in such a case, in a binarization process for last_sig_coeff_x_prefix and last_sig_coeff_y_prefix, maximum values of last_sig_coeff_x_prefix and last_sig_coeff_y_prefix may be set by incorporating values log 2ZoTbWidth and log 2ZoTbHeight.

TABLE 6

Table 9-77 - Syntax elements and associated binarizations

| residual_coding( ) | last_sig_coeff_x_prefix | TR | cMax = (log2ZoTbWidth << 1) − 1, cRiceParam = 0 |
|---|---|---|---|
| | last_sig_coeff_y_prefix | TR | cMax = (log2ZoTbHeight << 1) − 1, cRiceParam = 0 |
| | last_sig_coeff_x_suffix | FL | cMax = (1 << ((last_sig_coeff_x_prefix >> 1) − 1)) − 1 |
| | last_sig_coeff_y_suffix | FL | cMax = (1 << ((last_sig_coeff_y_prefix >> 1) − 1)) − 1 |
| | ... | | ... |
| ...... | | | ...... |

Meanwhile, according to an example, if a mode is the ISP mode and an LFNST is applied, when the signaling in Table 4 is applied, a spec test may be configured as in Table 7. When compared with Table 4, the condition (IntraSubPartitionsSplit[x0][y0]==ISP_NO_SPLIT in Table 4) in which an LFNST index is signaled with respect to only a case where a mode is not the ISP mode was deleted.

In the case of the single tree, if an LFNST index transmitted in a luma (cIdx=0) is reused in a chroma, an LFNST index transmitted with respect to the first ISP partition block in which a valid coefficient is present may be applied to a chroma transform block. Or, even in the case of the single tree, an LFNST index may be signaled separately from a luma component with respect to a chroma component. A description of variables described in Table 7 is the same as that in Table 4.

values 0, 1, and 2.0 indicates that an LFNST is not applied, and 1 and 2 indicate the first candidate and the second candidate, respectively, among two LFNST kernel candidates included in a selected LFNST set. The LFNST index may be coded through truncated unary binarization, and the values 0, 1, and 2 may be coded as respective bin strings 0, 10, and 11.

According to an example, an LFNST may be applied only when DCT-2 is applied to both a horizontal length and a vertical direction as a core transform. Accordingly, if an MTS index is signaled after the signaling of an LFNST index, the MTS index may be signaled only when a value of the LFNST index is 0, the MTS index may not be signaled when the LFNST index is not 0, and a core transform may be performed by applying DCT-2 to both the horizontal length and the vertical direction.

TABLE 7

```
residual_coding(x0, y0, log2TbWidth, log2TbHeight, cIdx) {
   ...
   if(log2TbWidth > 0)
      last_sig_coeff_x_prefix
   if(log2TbHeight > 0)
      last_sig_coeff_y_prefix
   if(last_sig_coeff_x_prefix > 3)
      last_sig_coeff_x_suffix
   if(last_sig_coeff_y_prefix > 3)
      last_sig_coeff_y_suffix
   ...
      cbWidth = CbWidth[ 0 ][ x0 ][ y0 ]
      cbHeight = CbHeight[ 0 ][ x0 ][ y0 ]
   if(Min(log2TbWidth, log2TbHeight) >= 2 && sps_lfnst_enabled_flag = = 1 &&
         CuPredMode[ chType ][ x0 ][ y0 ] = = MODE_INTRA &&
         (!intra_mip_flag[ x0 ][ y0 ] | | Min(log2TbWidth, log2TbHeight) >= 4) &&
         Max(cbWidth, cbHeight) <= MaxTbSizeY &&
               (cIdx = = 0 | | (treeType = = DUAL_TREE_CHROMA &&
               (cIdx = = 1 | | tu_cbf_cb[ x0 ][ y0 ] == 0)))) {
      if(lastSubBlock = = 0 && lastScanPos > 0 &&
                !(lastScanPos > 7 && (log2TbWidth = = 2 | | log2TbWidth = = 3)
                && log2TbWidth = = log2TbHeight))
         lfnst_idx[ x0 ][ y0 ]
   }
   if(cIdx = = 0 && lfnst_idx[ x0 ][ y0 ] = = 0 &&
         (log2TbWidth <= 5) && (log2TbHeight <= 5) &&
         (LastSignificantCoeffX < 16) && (LastSignificantCoeffY < 16) &&
         (IntraSubPartitionsSplit[ x0 ][ y0 ] = = ISP_NO_SPLIT) && (!cu_sbt_flag)) {
      if(((CuPredMode[ chType ][ x0 ][ y0 ] = = MODE_INTER &&
            sps_explicit_mts_inter_enabled_flag)
            | | (CuPredMode[ chType ][ x0 ][ y0 ] = = MODE_INTRA &&
            sps_explicit_mts_intra_enabled_flag)))
         tu_mts_idx[ x0 ][ y0 ]
   }
   ...
}
```

Meanwhile, according to an example, an LFNST index or/and an MTS index may be signaled in a coding unit level. As described above, the LFNST index may have three A value of an MTS index may have values 0, 1, 2, 3, and 4.0, 1, 2, 3, 4 may indicate that respective DCT-2/DCT-2, DST-7/DST-7, DCT-8/DST-7, DST-7/DCT-8, and DCT-8/

DCT-8 are applied to each of a horizontal length and a vertical direction. Furthermore, the MTS index may be coded through truncated unary binarization, and the values 0, 1, 2, 3, and 4 may be coded as respective bin strings 0, 10, 110, 1110, and 1111.

An LFNST index and an MTS index may be signaled in a coding unit level. The MTS index may be coded subsequently to the LFNST index in a coding unit level, and a coding unit syntax table thereof is as follows.

TABLE 8

| | Descriptor |
|---|---|
| coding_unit(x0, y0, cbWidth, cbHeight, cqtDepth, treeType, modeType) {<br>......<br>  if(cu_cbf) {<br>  ......<br>    LfnstDcOnly = 1<br>    LfnstZeroOutSigCoeffFlag = 1<br>    transform_tree(x0, y0, cbWidth, cbHeight, treeType)<br>    lfnstWidth = (treeType = = DUAL_TREE_CHROMA) ? cbWidth / SubWidthC<br>        : (IntraSubPartitionsSplitType = =<br>ISP_VER_SPLIT) ? cbWidth / NumIntraSubPartitions : cbWidth<br>      lfnstHeight = (treeType = = DUAL_TREE_CHROMA) ? cbHeight / SubHeightC<br>        : (IntraSubPartitionsSplitType = =<br>ISP_HOR_SPLIT) ? cbHeight / NumIntraSubPartitions : cbHeight<br>      if(Min(lfnstWidth, lfnstHeight) >= 4 && sps_lfnst_enabled_flag = = 1 &&<br>        CuPredMode[ chType ][ x0 ][ y0 ] = = MODE_INTRA &&<br>        (!intra_mip_flag[ x0 ][ y0 ] | | Min(lfnstWidth, lfnstHeight) >= 16) &&<br>        !transform_skip_flag[ x0 ][ y0 ] && Max(cbWidth, cbHeight) <= MaxTbSizeY)<br>{<br>    if((IntraSubPartitionsSplitType ! = ISP_NO_SPLIT | | LfnstDcOnly = = 0) &&<br>LfnstZeroOutSigCoeffFlag = = 1)<br>      lfnst_idx[ x0 ][ y0 ]<br>    }<br>    if(tu_cbf_luma[ x0 ][ y0 ] && treeType != DUAL_TREE_CHROMA &&<br>lfnst_idx[ x0 ][ y0 ] = = 0 && (cbWidth <= 32) && (cbHeight <= 32) &&<br>(IntraSubPartitionsSplit[ x0 ][ y0 ] = = ISP_NO_SPLIT) && (!cu_sbt_flag)) {<br>      if(((CuPredMode[ chType ][ x0 ][ y0 ] = = MODE_INTER &&<br>        sps_explicit_mts_inter_enabled_flag)<br>        | | (CuPredMode[ chType ][ x0 ][ y0 ] = = MODE_INTRA &&<br>        sps_explicit_mts_intra_enabled_flag)))<br>        tu_mts_idx[ x0 ][ y0 ]<br>    }<br>} | ae(v)<br><br><br><br><br><br><br><br><br><br><br><br><br><br><br><br><br>ae(v)<br><br><br><br><br><br>ae(v) |

In Table 8, the variables LfnstDcOnly and LfnstZeroOutSigCoeffFlag may be set as illustrated in Table 9 below.

The variable LfnstDcOnly becomes 1 if the last valid coefficient is located at a DC position (top left position) with respect to transform blocks in which a value of a corresponding CBF (1 when any one valid coefficient is present within a corresponding block and 0 if not) is 1, and becomes 0 if not. More specifically, in the case of a dual tree luma, the position of the last valid coefficient is checked with respect to one luma transform block. In the case of a dual tree chroma, the last valid coefficient position is checked with respect to both a transform block for Cb and a transform block for Cr. In the case of the single tree, the last valid coefficient position may be checked with respect to transform blocks for a luma, Cb, and Cr.

The variable LfnstZeroOutSigCoeffFlag is 0 when a valid coefficient is present at a position, that is, zero-out, when an LFNST is applied, and is 1 if not.

lfnst_idx[x0][y0] included in Table 8 and subsequent tables indicates an LFNST index for a corresponding coding unit. tu_mts_idx[x0][y0] indicates an MTS index for the corresponding coding unit.

As illustrated in Table 8, a condition in which whether a value transform_skip_flag[x0][y0] is 0 (!transform_skip_flag[x0][y0]) is checked may be included in a condition in which lfnst_idx[x0][y0] is signaled. In this case, the existing condition in which whether the value tu_mts_idx[x0][y0] is 0 is checked (i.e., to check whether it is DCT-2 with respect to both a horizontal length and a vertical direction) may be omitted. transform_skip_flag[x0][y0] indicates whether a coding unit is codeded as a transform skip mode in which a transform is omitted. The flag is signaled earlier than an MTS index and an LFNST index. That is, before the value tu_mtx_idx[x0][y0] is signaled, lfnst_idx[x0][y0] is signaled. Accordingly, only the condition for the value transform_skip_flag[x0][y0] may be checked.

As illustrated in Table 8, several conditions are checked when tu_mts_idx[x0][y0] is coded. As described above, tu_mts_idx[x0] [y0] is signaled only when the value lfnst_idx[x0][y0] is 0.

Furthermore, tu_cbf_luma[x0][y0] is a flag indicating whether a valid coefficient is present in a luma component. cbWidth and cbHeight indicate the width and height of each coding unit for a luma component.

According to Table 8, when both the width and height of a coding unit for a luma component are 32 or less, tu_mts_idx[x0][y0] may be signaled. That is, whether MTS is applied is determined by the width and height of a coding unit for a luma component.

According to another example, if transform block tiling (TU tiling) occurs (e.g., if a maximum transform size is set to 32, a 64×64 coding unit is partitioned into four 32×32 transform blocks and coded), and an MTS index may be signaled on the basis of the size of each transform block. For example, when both the width and height of a transform block are 32 or less, a value of the same MTS index may be applied to all transform blocks within a coding unit, and the same core transform may be applied thereto. Furthermore, when transform block tiling occurs, the value tu_cbf_luma

[x0][y0] in Table 8 may be set to 1 if the value for one transform block is a value of a CBF for a top left transform block or a value of the corresponding CBF is 1 with respect to all transform blocks.

Furthermore, according to Table 8, even in the case of the ISP mode (IntraSubPartitionsSplitType !=ISP_NO_SPLIT), lfnst_idx[x0][y0] may be configured to be signaled. A value of the same LFNST index may be applied to all ISP partition blocks.

Meanwhile, tu_mts_idx[x0][y0] may be signaled if a mode is not the ISP mode (IntraSubPartitionsSplit [x0][y0]==ISP_NO_SPLIT).

As in Table 8, if an MTS index is signaled right after an LFNST index, information for a core transform cannot be aware when residual coding is performed. That is, the MTS index is signaled after the residual coding. Accordingly, in a residual coding part, a part on which zero-out is performed by leaving 16 coefficients with respect to DST-7 or DCT-8 having a 32 length may be changed as in Table 9 below.

TABLE 9

|  | Descriptor |
|---|---|
| residual_coding(x0, y0, log2TbWidth, log2TbHeight, cIdx) { | |
|   if((sps_mts_enabled_flag && | |
| cu_sbt_flag && log2TbWidth < 6 && log2TbHeight < 6) | |
|   && cIdx = = 0 && log2TbWidth > 4) | |
|     log2ZoTb Width = 4 | |
|   else | |
|     log2ZoTbWidth = Min(log2Tb Width, 5) | |
|   MaxCcbs = 2 * (1 << log2TbWidth) * (1<< log2TbHeight) | |
|   if((sps_mts_enabled_flag && | |
| cu_sbt_flag && log2TbWidth < 6 && log2TbHeight < 6) | |
|     && cIdx = = 0 && log2TbHeight > 4) | |
|     log2ZoTbHeight = 4 | |
|   else | |
|     log2ZoTbHeight = Min(log2TbHeight, 5) | |
|   if(log2TbWidth > 0) | |
|     last_sig_coeff_x_prefix | ae(v) |
|   if(log2TbHeight > 0) | |
|     last_sig_coeff_y_prefix | ae(v) |
|   if(last_sig_coeff_x_prefix > 3) | |
|     last_sig_coeff_x_suffix | ae(v) |
|   if(last_sig_coeff_y_prefix > 3) | |
|     last_sig_coeff_y_suffix | ae(v) |
|   log2TbWidth = log2ZoTbWidth | |
|   log2TbHeight = log2ZoTbHeight | |
|   remBinsPass1 = ((1 << (log2TbWidth + log2TbHeight)) * 7) >> 2 | |
|   log2SbW = (Min(log2TbWidth, log2TbHeight) < 2 ? 1 : 2) | |
|   log2SbH = log2SbW | |
|   if(log2TbWidth + log2TbHeight > 3) { | |
|     if(log2TbWidth < 2) { | |
|       log2SbW = log2TbWidth | |
|       log2SbH = 4 − log2SbW | |
|     } else if(log2TbHeight < 2) { | |
|       log2SbH = log2TbHeight | |
|       log2SbW = 4 − log2SbH | |
|     } | |
|   } | |
|   numSbCoeff = 1 << (log2SbW + log2SbH) | |
|   lastScanPos = numSbCoeff | |
|   lastSubBlock = (1 << (log2TbWidth + log2TbHeight − (log2SbW + log2SbH))) − 1 | |
|   do { | |
|     if(lastScanPos = = 0) { | |
|       lastScanPos = numSbCoeff | |
|       lastSubBlock- - | |
|     } | |
|     lastScanPos- - | |
|     xS = DiagScanOrder[ log2TbWidth − log2SbW ][ log2TbHeight − log2SbH ] | |
|       [ lastSubBlock ][ 0 ] | |
|     yS = DiagScanOrder[ log2TbWidth − log2SbW ][ log2TbHeight − log2SbH ] | |
|       [ lastSubBlock ][ 1 ] | |
|     xC = (xS << log2SbW) + DiagScanOrder[ log2SbW ][ log2SbH ][ lastScanPos ][ 0 ] | |
|     yC = (yS << log2SbH) + DiagScanOrder[ log2SbW ][ log2SbH ][ lastScanPos ][ 1 ] | |
|   } while((xC != LastSignificantCoeffX) \| \| (yC != LastSignificantCoeffY)) | |
|   if(lastSubBlock = = 0 && log2TbWidth >= 2 && log2TbHeight >= 2 | |
| && | |
|     !transform_skip_flag[ x0 ][ y0 ] && lastScanPos > 0) | |
|     LfnstDcOnly = 0 | |
|   if((lastSubBlock > 0 && log2TbWidth >= 2 && log2TbHeight >= 2) \| \| | |
|     (lastScanPos > 7 && (log2TbWidth = = 2 \| \| log2TbWidth = = 3) && | |
|     log2TbWidth = = log2TbHeight)) | |
|     LfnstZeroOutSigCoeffFlag = 0 | |

As in Table 9, in a process of determining log 2ZoTb-Width and log 2ZoTbHeight (in this case, each of log 2ZoTbWidth and log 2ZoTbHeight indicate a base-2 log value of a width and a height for a top left region left after each zero-out is performed), a part where the value tu_mts_idx[x0][y0] is checked may be omitted.

In Table 9, the binarization of last_sig_coeff_x_prefix and last_sig_coeff_y_prefix may be determined based on log 2ZoTbWidth and log 2ZoTbHeight as in Table 6.

Furthermore, as in Table 9, when log 2ZoTbWidth and log 2ZoTbHeight are determined in residual coding, a condition in which sps_mts_enable_flag is checked may be added.

According to an example, if information for the last valid coefficient position for a luma transform block is recorded in a residual coding process, an MTS index may be signaled as in Table 10.

When both LumaLastSignificantCoeffX and LumaLastSignificantCoeffY are smaller than 16, this means that the last valid coefficient is present within a top left 16×16 region. If DST-7 or DCT-8 having a 32 length is applied in the current VVC standard, this indicates that there is a possibility that zero-out in which only a 16 transform coefficient is left from the leftmost or the highest is applied. Accordingly, tu_mts_idx[x0][y0] may be signaled and may indicate a transform kernel used for a core transform.

Meanwhile, according to another example, a coding unit syntax table, a transform unit syntax table and a residual coding syntax table are the same as those in the following tables. According to Table 11, an MTS index is moved to syntax from a transform unit level to a coding unit level, and

TABLE 10

| | Descriptor |
|---|---|
| coding_unit(x0, y0, cbWidth, cbHeight, cqtDepth, treeType, modeType) { ...... | ae(v) |
|   if(cu_cbf) { ...... | |
|     LfnstDcOnly = 1 | |
|     LfnstZeroOutSigCoeffFlag = 1 | |
|       LumaLastSignificantCoeffX = 0 | |
|       LumaLastSignificantCoeffY = 0 | |
|     transform_tree(x0, y0, cbWidth, cbHeight, treeType) | |
|     lfnstWidth = (treeType = = DUAL_TREE_CHROMA) ? cbWidth / SubWidthC | |
|         : (IntraSubPartitionsSplitType = = | |
| ISP_VER_SPLIT) ? cbWidth / NumIntraSubPartitions : cbWidth | |
|     lfnstHeight = (treeType = = DUAL_TREE_CHROMA) ? cbHeight / SubHeightC | |
|         : (IntraSubPartitionsSplitType = = | |
| ISP_HOR_SPLIT) ? cbHeight / NumIntraSubPartitions : cbHeight | |
|     if(Min(lfnstWidth, lfnstHeight) >= 4 && sps_lfnst_enabled_flag = = 1 && | |
|       CuPredMode[ chType ][ x0 ][ y0 ] = = MODE_INTRA && | |
|       (!intra_mip_flag[ x0 ][ y0 ] | | Min(lfnstWidth, lfnstHeight) >= 16) && | |
|       !transform_skip_flag[ x0 ][ y0 ] && Max(cbWidth, cbHeight) <= MaxTbSizeY) | |
|     { | |
|       if((IntraSubPartitionsSplitType ! = ISP_NO_SPLIT | | LfnstDcOnly = = 0) && LfnstZeroOutSigCoeffFlag = = 1) | |
|         lfnst_idx[ x0 ][ y0 ] | ae(v) |
|     } | |
|     if(tu_cbf_luma[ x0 ][ y0 ] && treeType != DUAL_TREE_CHROMA && lfnst_idx[ x0 ][ y0 ] = = 0 && (cbWidth <= 32) && (cbHeight <= 32) && (LumaLastSignificantCoeffX < 16) && (LumaLastSignificantCoeffY < 16) && (IntraSubPartitionsSplit[ x0 ][ y0 ] = = ISP_NO_SPLIT) && (!cu_sbt_flag)) { | |
|       if(((CuPredMode[ chType ][ x0 ][ y0 ] = = MODE_INTER && | |
|         sps_explicit_mts_inter_enabled_flag) | |
|         | | (CuPredMode[ chType ][ x0 ][ y0 ] = = MODE_INTRA && | |
|         sps_explicit_mts_intra_enabled_flag))) | |
|         tu_mts_idx[ x0 ][ y0 ] | ae(v) |
|     } | |
| } | |

In Table 10, LumaLastSignificantCoeffX and LumaLastSignificantCoeffY indicate X coordinates and Y coordinates of the last valid coefficient position for respective luma transform blocks. A condition in which both LumaLastSignificantCoeffX and LumaLastSignificantCoeffY need to be smaller than 16 was added to Table 10. If any one of the two becomes 16 or more, DCT-2 is applied to both a horizontal length and a vertical direction. Accordingly, it may be inferred that the signaling of tu_mts_idx[x0][y0] is omitted and DCT-2 is applied to both the horizontal length and the vertical direction.

is signaled after the signaling of an LFNST index. Furthermore, if ISP is applied to a coding unit, a restriction condition in which an LFNST is not permitted was removed. If ISP is applied to the coding unit, all intra prediction blocks may be applied to an LFNST because the restriction condition in which the LFNST is not permitted is removed. Furthermore, both the MTS index and the LFNST index are conditionally signaled in the last part of the coding unit level.

TABLE 11

| coding_unit(x0, y0, cbWidth, cbHeight, cqtDepth, treeType, modeType) { ... |
|---|
|   LfnstDcOnly = 1 |

TABLE 11-continued

```
LfnstZeroOutSigCoeffFlag = 1
MtsZeroOutSigCoeffFlag = 1
transform_tree(x0, y0, cbWidth, cbHeight, treeType)
    lfnstWidth = (treeType = = DUAL_TREE_CHROMA) ? cbWidth / SubWidthC
        : (IntraSubPartitionsSplitType = =
ISP_VER_SPLIT) ? cbWidth / NumIntraSubPartitions : cbWidth
    lfnstHeight = (treeType = = DUAL_TREE_CHROMA) ? cbHeight / SubHeightC
        : (IntraSubPartitionsSplitType = =
ISP_HOR_SPLIT) ? cbHeight / NumIntraSubPartitions : cbHeight
    if(Min(lfnstWidth, lfnstHeight) >= 4 && sps_lfnst_enabled_flag = = 1 &&
        CuPredMode[ chType ][ x0 ][ y0 ] = = MODE_INTRA &&
        (!intra_mip_flag[ x0 ][ y0 ] | | Min(lfnstWidth, lfnstHeight) >= 16) &&
        Max(cbWidth, cbHeight) <= MaxTbSizeY) {
        if((IntraSubPartitionsSplitType ! = ISP_NO_SPLIT | | LfnstDcOnly = = 0) &&
LfnstZeroOutSigCoeffFlag = = 1)
            lfnst_idx[ x0 ][ y0 ]
    }
    if(treeType != DUAL_TREE_CHROMA && lfnst_idx[ x0 ][ y0 ] = = 0 &&
        transform_skip_flag[ x0 ][ y0 ] = = 0 && Max(cbWidth, cbHeight) <= 32 &&
        IntraSubPartitionsSplit[x0][y0] = = ISP_NO_SPLIT && (!cu_sbt_flag) &&
        MtsZeroOutSigCoeffFlag = = 1 && tu_cbf_luma[ x0 ][ y0 ]) {
        if(((CuPredMode[ chType ][ x0 ][ y0 ] = = MODE_INTER &&
            sps_explicit_mts_inter_enabled_flag)
            | | (CuPredMode[ chType ][ x0 ][ y0 ] = = MODE_INTRA &&
            sps_explicit_mts_intra_enabled_flag)))
            mts_idx[ x0 ][ y0 ]
    }
...
```

TABLE 12

```
transform_unit(x0, y0, tbWidth, tbHeight, treeType, subTuIndex, chType) {
...
    if(tu_cbf_luma[ x0 ][ y0 ] && treeType != DUAL_TREE_CHROMA
        && (tbWidth <= 32) && (tbHeight <= 32)
        && (IntraSubPartitionsSplit[ x0 ][ y0 ] = = ISP_NO_SPLIT) && (!cu_sbt_flag)) {
        if(sps_transform_skip_enabled_flag && !BdpcmFlag[ x0 ][ y0 ] &&
            tbWidth <= MaxTsSize && tbHeight <= MaxTsSize)
            transform_skip_flag[ x0 ][ y0 ]
    }
...
```

TABLE 13

```
residual_coding(x0, y0, log2TbWidth, log2TbHeight, cIdx) {
...
    if ((cu_sbt_flag && log2TbWidth < 6 && log2TbHeight < 6)
        && cIdx = = 0 && log2TbWidth > 4)
        log2ZoTbWidth = 4
    else
        log2ZoTbWidth = Min(log2TbWidth, 5)
    MaxCcbs = 2 * (1 <<log2TbWidth) * (1<< log2TbHeight)
    if ((cu_sbt_flag && log2TbWidth < 6 && log2TbHeight < 6)
        && cIdx = = 0 && log2TbHeight > 4)
        log2ZoTbHeight = 4
    else
        log2ZoTbHeight = Min(log2TbHeight, 5)
...
    if((lastSubBlock > 0 && log2TbWidth >= 2 && log2TbHeight >=
2) | |
        (lastScanPos > 7 && (log2TbWidth = = 2 | | log2TbWidth = =
3) &&
        log2TbWidth = = log2TbHeight))
        LfnstZeroOutSigCoeffFlag = 0
    if((LastSignificantCoeffX > 15 | | LastSignificantCoeffY > 15) &&
        cIdx = = 0)
        MtsZeroOutSigCoeffFlag = 0
...
```

In Table 11, MtsZeroOutSigCoeffFlag is initially set to 1, and this value may be changed in the residual coding of Table 7. The variable MtsZeroOutSigCoeffFlag changes from 1 to 0 if there is a significant coefficient in the area (LastSignificantCoeffX >15||LastSignificantCoeffY>15) that should be filled with 0 due to zero out. In this case, as shown in Table 11, the MTS index is not signaled.

Meanwhile, as shown in Table 11, when tu_cbf_luma[x0][y0] is 0, mts_idx[x0][y0] coding may be omitted. That is, if the CBF value of the luma component is 0, since no transform is applied, there is no need to signal the MTS index, so the MTS index coding may be omitted.

According to an example, the technical feature may be implemented in another conditional syntax. For example, after the MTS is performed, it is possible to derive a variable indicating whether a significant coefficient exists in a region other than the DC region of the current block, and if the variable indicates that the significant coefficient exists in a region excluding the DC region, MTS index may be signaled. That is, the existence of a significant coefficient in a region other than the DC region of the current block indicates that the tu_cbf_luma[x0][y0] value is 1, and in this case, the MTS index may be signaled.

The variable may be expressed as MtsDcOnly, and after the variable MtsDcOnly is initially set to 1 at the coding unit level, the value may be changed to 0 when the residual coding level indicates that a significant coefficient exists in an area other than the DC area of the current block. When the variable MtsDcOnly is 0, the image information may be configured such that the MTS index is signaled.

If tu_cbf_luma[x0][y0] is 0, the variable MtsDcOnly maintains an initial value of 1 because the residual coding syntax is not called at the transform unit level of Table 12.

In this case, since the variable MtsDcOnly is not changed to 0, the image information may be configured so that the MTS index is not signaled. That is, the MTS index is not parsed and signaled.

Meanwhile, the decoding apparatus may determine the color index cIdx of the transform coefficient to derive the variable MtsZeroOutSigCoeffFlag of Table 13. The color index cIdx of 0 means a luma component.

According to an example, since the MTS may be applied only to the luma component of the current block, the decoding apparatus may determine whether the color index is luma when deriving the variable MtsZeroOutSigCoeffFlag that determines whether to parse the MTS index. (if cIdx==0, MtsZeroOutSigCoeffFlag=0).

The variable MtsZeroOutSigCoeffFlag is a variable indicating whether zero-out is performed when MTS is applied. It indicates whether the transform coefficient exists in the upper-left region where the last significant coefficient may exist due to zero-out after the MTS is performed, that is, in the region other than the upper-left 16×16 region. The variable MtsZeroOutSigCoeffFlag is initially set to 1 at the coding unit level as shown in Table 11 (MtsZeroOutSigCoeffFlag=1), and if the transform coefficient exists in a region other than the 16×16 region, the value changes from 1 to 0 at the residual coding level as shown in Table 13 Can be changed (MtsZeroOutSigCoeffFlag=0). If the value of the variable MtsZeroOutSigCoeffFlag is 0, the MTS index is not signaled.

As shown in Table 13, at the residual coding level, the non-zero-out region in which non-zero transform coefficients may exist may be set depending on whether or not zero-out accompanying MTS is performed, and even in this case, when the color index (cIdx) is 0, the non-zero-out area may be set as the upper left 16×16 region of the current block.

In this way, when deriving a variable for determining whether to parse the MTS index, it is determined whether the color component is luma or chroma. However, since the LFNST may be applied to both the luma component and the chroma component of the current block, the color component is not determined when deriving a variable determining whether to parse the LFNST index.

For example, Table 11 shows a variable LfnstZeroOutSigCoeffFlag that may indicate that the zero-out is performed when the LFNST is applied. The variable LfnstZeroOutSigCoeffFlag indicates whether a significant coefficient exists in the second region except for the first region at the upper left of the current block. This value is initially set to 1, and if there is a significant coefficient in the second area, the value may change to 0. The LFNST index may be parsed only when the value of the initially set variable LfnstZeroOutSigCoeffFlag is maintained at 1. When determining and deriving whether the variable LfnstZeroOutSigCoeffFlag value is 1, since the LFNST may be applied to both the luma component and the chroma component of the current block, the color index of the current block is not determined.

Figure 15:
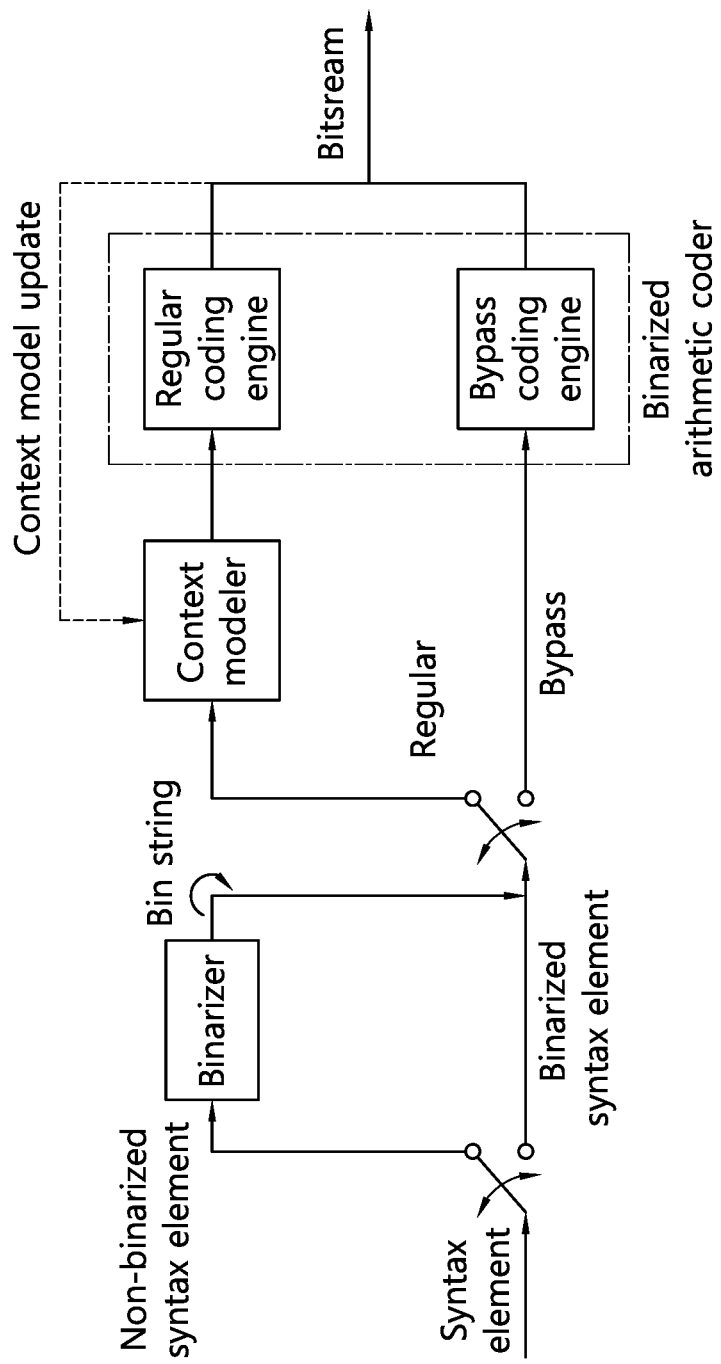
FIG. 15 is a diagram illustrating a block diagram of a CABAC encoding system according to an embodiment.

FIG. 15 is a diagram illustrating a block diagram of a CABAC encoding system according to an embodiment, and illustrates a block diagram of context-adaptive binary arithmetic coding (CABAC) for coding a single syntax element.

In an encoding process of CABAC, first, if an input signal is a syntax element not a binary value, the input signal is transformed into a binary value through binarization. If the input signal is already a binary value, the input signal is bypassed without passing through binarization, that is, the input signal is inputted to an encoding engine. In this case, a binary number 0 or 1 for setting the binary value is called a bin. For example, when a binary string after binarization is 110, each of 1, 1, and 0 is called one bin. A bin(s) for one syntax element may indicate a value of a corresponding syntax element.

The binarized bins are inputted to a regular encoding engine or a bypass encoding engine.

The regular encoding engine assigns context into which a probability value is incorporated to a model with respect to a corresponding bin, and codes the 0 corresponding bin based on the assigned context model. After performing coding on each bin, the regular encoding engine may update a probability model for a corresponding bin. The coded bin is a called context-coded bin.

The bypass encoding engine omits a procedure of estimating the probability with respect to an input bin and a procedure of updating a probability model applied to a corresponding bin after coding. A coding speed can be improved by coding an input bin by applying a uniform probability distribution instead of assigning context. The coded bin is called a bypass bin.

In entropy coding, whether the coding will be performed through the regular encoding engine or the bypass encoding engine is determined, and a coding path may be switched. In the entropy decoding, the same process as the coding is reversely performed.

If a truncated unary code is applied as a binarization method for an LFNST index, the LFNST index is set as a maximum of 2 bins, and 0, 10, and 11 are assigned as binary codes for 0, 1, and 2, that is, values of possible LFNST indices.

According to an example, context-based CABAC coding may be applied to the first bin of an LFNST index (regular coding), and bypass coding may be applied to the second bin thereof.

Furthermore, according to another example, context-based CABAC coding may be applied to both the first and second bins of an LFNST index. The assignment of ctxInc of an LFNST index according to such a context-coded bin is indicated as a table as follows.

TABLE 14

| Syntax element | binIdx | | | | |
| --- | --- | --- | --- | --- | --- |
| | 0 | 1 | 2 | 3 | 4 | >=5 |
| ... | ... | ... | ... | ... | ... |
| lfnst_idx[ ][ ] | (treeType != SINGLE_TREE) ? 1 : 0 | 2 | na | na | na | na |
| ... | ... | ... | ... | ... | ... |

As in Table 14, the No. 0 context may be applied to a single tree with respect to the first bin (binIdx=0), and the No. 1 context may be applied to a case where a tree is not the single tree. Furthermore, as in Table 14, the No. 2 context may be applied to the second bin (binIdx=1). That is, two contexts may be assigned to the first bin, one context may be assigned to the second bin, and the contexts may be distinguished based on ctxInc values 0, 1, and 2.

In this case, the single tree means that a luma component and a chroma component are coded with the same coding structure. If a coding unit has the same coding structure and is partitioned, the size of the coding unit is a specific threshold value or less, and a luma component and a chroma component are coded with separate tree structures, the corresponding coding units may be considered as a dual tree and context of the first bin may be determined. That is, as in Table 14, a No. 1 context may be assigned.

Or the first bin may be coded using the No. 0 context if a value of a variable treeType is assigned as SINGLE_TREE, and may be performed using the No. 1 context if not.

According to an example, in an encoding process, when only the first (or the second) candidate among two LFNST kernel candidates is attempted, an LFNST index has fixed two bin values with respect to the corresponding candidate (if coding is attempted on only the first candidate, the first candidate may be coded as 10, and if coding is attempted on only the second candidate, the second candidate may be coded as 11). In this case, if the second bin is coded as a bypass, although the second bin has a fixed value (0 or 1), the amount of fixed bits occurs with respect to the second bin, so that a coding cost may be greatly increased with respect to the second bin. If the second bin is coded using a context method not a bypass, if coding is performed with respect to only one fixed LFNST kernel candidate, a coding cost can be greatly reduced because the probability that a corresponding fixed value (0 or 1) may occur with respect to the second bin is updated toward 100%. In summary, since two bins for LFNST index are coded by using a context method, although only one LFNST kernel candidate is fixed and applied in an encoding process, a loss of coding efficiency can be minimized and encoding complexity can be reduced, compared to a case where two candidates are applied. Accordingly, a degree of substantial freedom can be assigned in finding a performance-complexity trade-off in the encoding process.

The following drawings are written in order to describe a detailed example of this specification. A name of a detailed apparatus or a name of a detailed signal/message/field described in the drawings are illustratively presented, and technical characteristics of this specification are not restricted to the detailed names used in the drawings.

Figure 16:
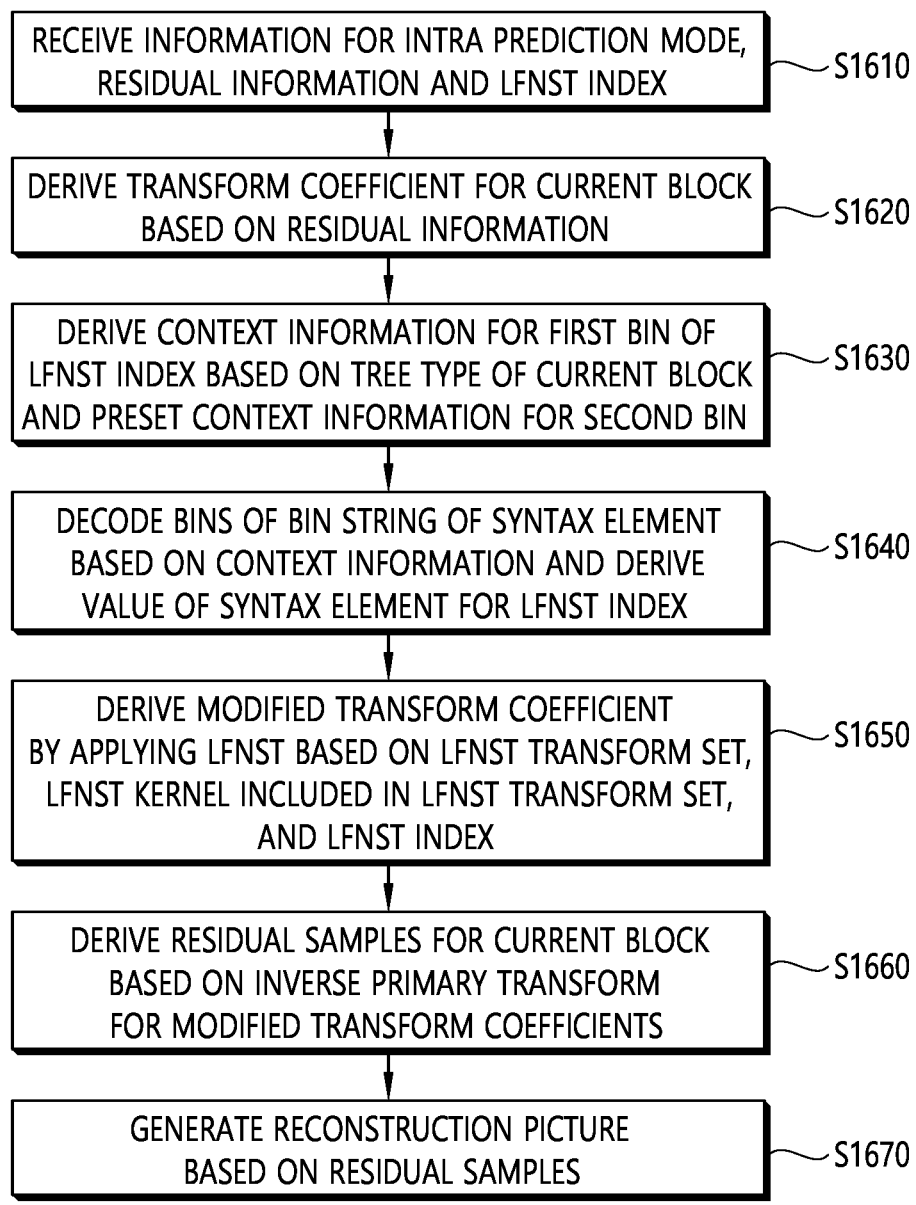
FIG. 16 is a flowchart illustrating an operation of a video decoding apparatus according to an embodiment of this document.

FIG. 16 is a flowchart illustrating an operation of a video decoding apparatus according to an embodiment of this document.

Steps disclosed in FIG. 16 are based on some of the contents described with reference to FIGS. 5 to 15. Accordingly, detailed contents redundant with the contents described with reference to FIGS. 3 and 5 to 15 are omitted or simply given.

A decoding apparatus 300 according to an embodiment may receive information for an intra prediction mode, residual information and an LFNST index from a bitstream (S1610).

Such information is received as syntax information, and the syntax information is received as a binarized bin string including 0 and 1.

The decoding apparatus may derive binarization information for a syntax element of the LFNST index. This is for generating a candidates set for a binarization value which may be included in the syntax element of a received transform index. According to the present embodiment, the syntax element of the LFNST index may be binarized using a truncated unary code method.

The syntax element of a transform index according to the present embodiment may indicate any one of whether an LFNST is applied and an LFNST kernel included in an LFNST transform set. If an LFNST transform set includes two LFNST kernels, a value of the syntax element of an LFNST index may be three types.

That is, according to an embodiment, a syntax element value for an LFNST index may include 2 indicating a case where an LFNST is not applied to a current block, 1 indicating the first LFNST kernel of an LFNST kernel, and 2 indicating the second LFNST kernel of the LFNST kernel.

In this case, a value of syntax elements for the three LFNST indices may be coded as 0, 10, and 11 according to a truncated unary code method. That is, the value 0 for the syntax element may be binarized as '0', the value 1 for the syntax element may be binarized '10', and the value 2 for the syntax element may be binarized as '11.'

Furthermore, the decoding apparatus may derive a transform coefficient by performing residual coding based on the received residual information (S1620).

The decoding apparatus 300 may decode, from a bitstream, information on quantized transform coefficients for a current block, and may derive quantized transform coefficients for a target block based on the information on the quantized transform coefficients for the current block. The information on the quantized transform coefficients for the target block may be included in a sequence parameter set (SPS) or a slice header, and may include at least one of information on whether a simplification transform (RST) is applied, information on a simplification factor, information on a minimum transform size to which a simplification transform is applied, information on a maximum transform size to which a simplification transform is applied, a simplification reverse transform size, and information on a transform index indicating any one of transform kernel matrices included in a transform set.

The decoding apparatus 300 may derive transform coefficients by performing dequantization on residual information for a current block, that is, quantized transform coefficients, and may arrange the derived transform coefficients in a given scanning order.

Specifically, the derived transform coefficients may be arranged in a 4×4 block unit in a backward scan order, and transform coefficients within a 4×4 block may also be arranged in a backward scan order. That is, the transform coefficients on which dequantization is performed may be disposed in a backward scan order applied in a video codec, such as that in VVC or HEVC.

A transform coefficient derived based on such residual information may be a dequantized transform coefficient as described above and may be a quantized transform coefficient. That is, the transform coefficient has only to be data by which whether the data is non-zero data in a current block regardless of quantization.

The decoding apparatus may derive a residual sample by applying an inverse transform to the quantized transform coefficient.

As described above, the decoding apparatus may derive a residual sample by applying an LFNST, that is, a non-separation transform, or MTS, that is, a separation transform. Such transforms may be performed based on an LFNST index indicating each LFNST kernel, that is, an LFNST matrix, and an MTS index indicating an MTS kernel, respectively.

Meanwhile, the decoding apparatus may derive information for the first bin of the LFNST index based on a tree type of the current block, and may derive preset context information for the second bit (S1630).

Context information for the first bin may be derived as a different value depending on a tree type of a current block. For example, if a tree type of a current block is a single tree, the first bin may be derived as first context information. If a tree type of a current block is not a single tree, the first bin may be derived as second context information.

Meanwhile, context information for the second bin may be derived as a preset one value regardless of a tree type of a current block. That is, according to an example, two bins of a bin string of an LFNST index may be decoded based on a context model not a bypass method.

The decoding apparatus may decode bins of a syntax element bin string based on the context information, and may derive a value of the syntax element for the LFNST index applied to the current block among binarized values which may be included in the syntax element of the LFNST index based on context information-based decoding (S1640).

In summary, the decoding apparatus may receive a bin string binarized using a truncated unary code method, and decodes the syntax element of the LFNST index based on the context information.

That is, whether any one of LFNST indices 0, 1, and 2 is applied to a current target block may be derived.

The decoding apparatus 300 may determine an LFNST transform set based on a mapping relation according to an intra prediction mode applied to the current block, and may derive a modified transform coefficient by applying an LFNST based on an LFNST transform set, an LFNST kernel included in the LFNST transform set, and an LFNST index (S1650).

Thereafter, the decoding apparatus may derive residual samples for the current block based on an inverse primary transform for the modified transform coefficients (S1660), and may generate a reconstruction picture based on the residual samples (S1670).

The following drawings are written in order to describe a detailed example of this specification. A name of a detailed apparatus or a name of a detailed signal/message/field described in the drawings are illustratively presented, and technical characteristics of this specification are not restricted to the detailed names used in the drawings.

Figure 17:
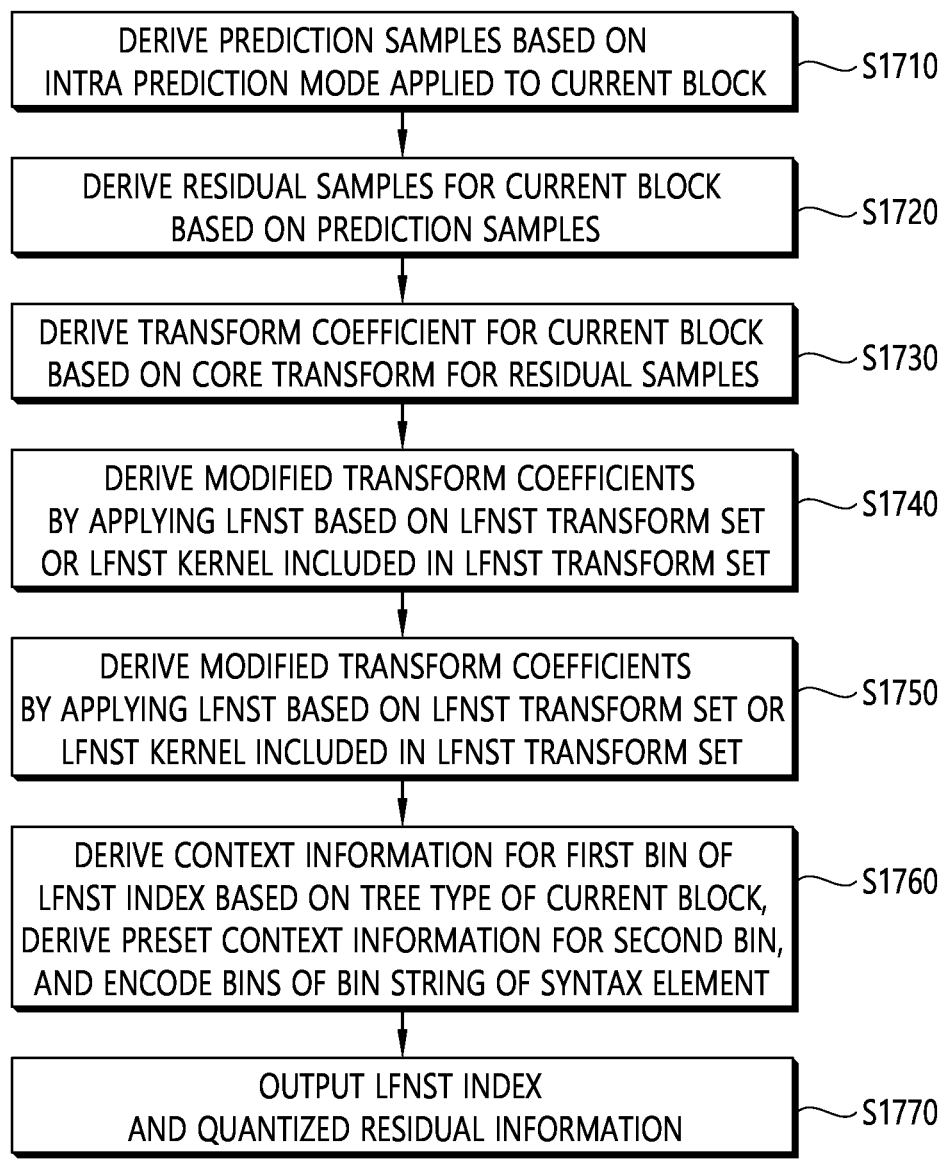
FIG. 17 is a flowchart illustrating an operation of a video encoding apparatus according to an embodiment of this document.

FIG. 17 is a flowchart illustrating an operation of a video encoding apparatus according to an embodiment of this document.

Steps disclosed in FIG. 17 are based on some of the contents described with reference to FIGS. 5 to 15. Accordingly, detailed contents redundant with the contents described with reference to FIGS. 2 and 5 to 15 are omitted or simply given.

The encoding apparatus 200 according to an embodiment may derive prediction samples for a current block based on an intra prediction mode applied to the current block (S1710).

The encoding apparatus 200 may derive residual samples for the current block based on the prediction samples (S1720).

The encoding apparatus 200 may derive a transform coefficient for the current block by applying at least one of an LFNST or MTS to the residual samples, and may arrange the transform coefficient in a given scanning order.

The encoding apparatus may derive the transform coefficient for the current block based on a core transform for the residual samples (S1730).

The core transform may be performed through a plurality of transform kernels as in MTS. In this case, the transform kernels may be selected based on an intra prediction mode.

After deriving the transform coefficient by applying the MTS, the encoding apparatus may zero-out the remaining region of the current block except a top left specific region of the current block, for example, a 16×16 region.

Furthermore, the encoding apparatus 200 may determine whether to perform a secondary transform or a non-separation transform, specifically an LFNST on the transform coefficient for the current block, and may derive modified transform coefficients by applying the LFNST to the transform coefficient. Specifically, the encoding apparatus may derive the modified transform coefficients by applying the LFNST based on an LFNST transform set and an LFNST kernel included in the LFNST transform set (S1740).

The LFNST is a non-separation transform in which a transform is applied without separating coefficients in specific direction, unlike the core transform in which coefficients, that is, a transform target, are separated in a vertical or horizontal length and transformed. Such a non-separation transform may be a low frequency non-separation transform in which a transform is applied to only a low frequency region not the entire target block, that is, a transform target.

The encoding apparatus may encode at least one of an LFNST index indicating an LFNST kernel or an MTS index indicating an MTS kernel.

First, the encoding apparatus may derive a value of a syntax element for the LFNST index, and may binarize the value of the syntax element for the LFNST index (S1750).

The syntax element of the LFNST index according to the present embodiment may indicate any one of whether an LFNST is applied and an LFNST kernel included in an LFNST transform set. If the LFNST transform set includes two LFNST kernels, a value of the syntax element of the LFNST index may be three types.

According to an embodiment, the value of the syntax element for the LFNST index may be derived as 2 indicating a case where an LFNST is not applied to a current block, 1 indicating the first LFNST kernel of LFNST kernels, or 2 indicating the second LFNST kernel of the LFNST kernels.

The encoding apparatus may binarize a value of a syntax element for three transform indices as 0, 10, or 11 according to a truncated unary code method. That is, the value 0 for the syntax element may be binarized '0', the value 1 for the syntax element may be binarized '10', and the value 2 for the syntax element may be binarized as '11.' The encoding apparatus may binarize a value of a syntax element for a derived transform index as any one of '0', '10, and '11.'

The encoding apparatus may derive context information for the first bin of the LFNST index based on a tree type of the current block, may encode preset context information for the second bin, and may derive bins of a bin string of the syntax element based on the context information (S1760).

The context information for the first bin may be derived as a different value based on a tree type of the current block. For example, when a tree type of the current block is a single tree, the first bin may be derived as first context information. When a tree type of the current block is not a single tree, the first bin may be derived as second context information.

Meanwhile, the context information for the second bin may be derived as one value regardless of a tree type of the current block. That is, according to an example, two bins are not a bypass method, but a bin string of the LFNST index may be encoded based on a context model not.

In summary, the encoding apparatus binarizes a bin string of an LFNST index by using a truncated unary code method, and encodes a syntax element of the LFNST index for a corresponding binarization value based on different context information.

The encoding apparatus may signal at least one of the LFNST index and the MTS index in a coding unit level, may configure and output image information so that the MTS index is signaled after the signaling of the LFNST index, and may output quantized residual information after encoding (S1770).

Furthermore, the encoding apparatus may derive quantized transform coefficients by performing quantization based on the transform coefficient for the current block or the modified transform coefficients, and may encode and output image information including information on the quantized transform coefficients.

The encoding apparatus may generate residual information including information on quantized transform coefficients. The residual information may include the above-described transform related information/syntax element. The encoding apparatus may encode image/video information including residual information and output the encoded image/video information in the form of a bitstream.

More specifically, the encoding apparatus may generate information about the quantized transform coefficients and encode the information about the generated quantized transform coefficients.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

In addition, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

What is claimed is:

1. An image decoding method performed by a decoding apparatus, comprising:
   receiving residual information from a bitstream;
   deriving transform coefficients for a current block based on the residual information;

deriving residual samples based on applying a low frequency non-separable transform (LFNST) to the transform coefficients; and
generating a reconstruction picture based on the residual samples,
wherein the image decoding method further comprises:
deriving context increments for two bins of an LFNST index;
decoding a bin string of the LFNST index based on the context increments; and
deriving a value of the LFNST index,
wherein the LFNST is performed based on an LFNST kernel derived from the LFNST index,
wherein the two bins of the LFNST index are decoded based on context coding other than bypass coding,
wherein a context increment for the context coding of a first bin of the two bins is derived based on whether a tree type of the current block is a single tree or not,
wherein a context increment for the context coding of a second bin of the two bins is derived as a fixed value equal to 2 regardless of whether the tree type of the current block is the single tree,
wherein:
based on the tree type of the current block is the single tree, the context increment for the first bin is derived as a first value, and
based on the tree type of the current block is not the single tree, the context increment for the first bin is derived as a second value.

2. The image decoding method of claim 1, wherein the fixed value is different from the first value and the second value.

3. The image decoding method of claim 1, wherein:
an LFNST transform set comprises two LFNST kernels, and
the value of the LFNST index comprises any one of 0 indicating a case where the LFNST is not applied to the current block, 1 indicating a first LFNST kernel among the two LFNST kernels, and 2 indicating a second LFNST kernel among the two LFNST kernels.

4. The image decoding method of claim 3, wherein:
the value of the LFNST index is binarized as a truncated unary code, and
the value of the LFNST index being 0 is binarized as '0', the value of the LFNST index being 1 is binarized as '10', and the value of the LFNST index being 2 is binarized as '11'.

5. An image encoding method performed by an encoding apparatus, comprising:
deriving prediction samples for a current block;
deriving residual samples for the current block based on the prediction samples;
deriving transform coefficients for the current block based on a primary transform for the residual samples;
deriving modified transform coefficients for the current block by applying a low frequency non-separable transform (LFNST) to the transform coefficients; and
encoding an LFNST index indicating an LFNST kernel,
wherein the LFNST is performed based on the LFNST kernel,
wherein encoding the LFNST index comprises:
deriving a value of the LFNST index;
deriving context increments for two bins of the LFNST index; and
encoding a bin string of the LFNST index based on the context increments,
wherein the two bins of the LFNST index are encoded based on context coding other than bypass coding,
wherein a context increment for the context coding of a first bin of the two bins is derived based on whether a tree type of the current block is a single tree or not,
wherein a context increment for the context coding of a second bin of the two bins is derived as a fixed value equal to 2 regardless of whether the tree type of the current block is the single tree,
wherein:
based on the tree type of the current block is the single tree, the context increment for the first bin is derived as a first value, and
based on the tree type of the current block is not the single tree, the context increment for the first bin is derived as a second value.

6. The image encoding method of claim 5, wherein the fixed value is different from the first value and the second value.

7. The image encoding method of claim 5, wherein:
an LFNST transform set comprises two LFNST kernels, and
the value of the LFNST index comprises any one of 0 indicating a case where the LFNST is not applied to the current block, 1 indicating a first LFNST kernel among the two LFNST kernels, and 2 indicating a second LFNST kernel among the two LFNST kernels.

8. The image encoding method of claim 7, wherein:
the value of the LFNST index is binarized as a truncated unary code, and
the value of the LFNST index being 0 is binarized as '0', the value of the LFNST index being 1 is binarized as '10', and the value of the LFNST index being 2 is binarized as '11'.

9. A non-transitory computer-readable digital storage medium that stores a bitstream generated by a method, the method comprising:
deriving prediction samples for a current block;
deriving residual samples for the current block based on the prediction samples;
deriving transform coefficients for the current block based on a primary transform for the residual samples;
deriving modified transform coefficients for the current block by applying a low frequency non-separable transform (LFNST) to the transform coefficients; and
encoding an LFNST index indicating an LFNST kernel,
wherein the LFNST is performed based on the LFNST kernel,
wherein encoding the LFNST index comprises:
deriving a value of the LFNST index;
deriving context increments for two bins of the LFNST index; and
encoding a bin string of the LFNST index based on the context increments,
wherein the two bins of the LFNST index are encoded based on context coding other than bypass coding,
wherein a context increment for the context coding of a first bin of the two bins is derived based on whether a tree type of the current block is a single tree or not,
wherein a context increment for the context coding of a second bin of the two bins is derived as a fixed value equal to 2 regardless of whether the tree type of the current block is the single tree,
wherein:
based on the tree type of the current block is the single tree, the context increment for the first bin is derived as a first value, and based on the tree type of the current block is not the single tree, the context increment for the first bin is derived as a second value.

* * * * *